(12) United States Patent
Mori et al.

(10) Patent No.: US 9,069,273 B2
(45) Date of Patent: Jun. 30, 2015

(54) YELLOW TONER AND METHOD FOR PRODUCING THE YELLOW TONER

(71) Applicant: CANON KABUSHIKI KAISHA, Tokyo (JP)

(72) Inventors: Shosei Mori, Hiratsuka (JP); Takeshi Sekiguchi, Tokyo (JP); Taichi Shintou, Saitama (JP); Takeshi Miyazaki, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/162,066

(22) Filed: Jan. 23, 2014

(65) Prior Publication Data

US 2014/0134531 A1    May 15, 2014

Related U.S. Application Data

(63) Continuation of application No. PCT/JP2013/004932, filed on Aug. 21, 2013.

(30) Foreign Application Priority Data

Aug. 24, 2012    (JP) .................................. 2012-184756

(51) Int. Cl.
    *G03G 9/09*     (2006.01)
    *C09B 35/34*    (2006.01)
    *G03G 9/08*     (2006.01)

(52) U.S. Cl.
    CPC ................ *G03G 9/091* (2013.01); *C09B 35/34* (2013.01); *G03G 9/0806* (2013.01); *G03G 9/081* (2013.01); *G03G 9/0914* (2013.01)

(58) Field of Classification Search
    USPC ............................ 430/108.2, 108.21, 108.23
    See application file for complete search history.

(56) References Cited

U.S. PATENT DOCUMENTS 6,878,196 B2    4/2005    Harada et al.
7,507,282 B2    3/2009    Ozawa et al.
(Continued)

FOREIGN PATENT DOCUMENTS

JP    61-112160 A       5/1986
JP    2003-277662 A    10/2003
(Continued)

OTHER PUBLICATIONS

Translation of JP 2007-197538 published Aug. 2007.*
(Continued)

*Primary Examiner* — Peter Vajda
(74) *Attorney, Agent, or Firm* — Fitzpatrick, Cella, Harper and Scinto

(57) ABSTRACT

A yellow toner is provided which is much more improved in color development and chroma, and much more improved in light resistance. The yellow toner contains, at least, a binder resin, a wax, and a coloring agent. The coloring agent is a compound represented by the following general formula (1).

General formula (1)

10 Claims, 1 Drawing Sheet

(56) References Cited

U.S. PATENT DOCUMENTS

| | | |
|---|---|---|
| 7,510,605 B2 | 3/2009 | Harada et al. |
| 7,833,685 B2 | 11/2010 | Tanaka et al. |
| 8,062,383 B2 | 11/2011 | Tateishi et al. |
| 8,080,067 B2 | 12/2011 | Tateishi et al. |
| 8,101,011 B2 | 1/2012 | Tateishi et al. |
| 8,211,606 B2 | 7/2012 | Murai et al. |
| 8,222,410 B2 | 7/2012 | Tateishi et al. |
| 2008/0199615 A1* | 8/2008 | Harada et al. .................. 427/256 |
| 2009/0291377 A1* | 11/2009 | Hirose et al. .................... 430/97 |
| 2014/0080049 A1 | 3/2014 | Ujifusa et al. |
| 2014/0170553 A1 | 6/2014 | Mori et al. |

FOREIGN PATENT DOCUMENTS

| | | | |
|---|---|---|---|
| JP | 2007-191590 A | 8/2007 | |
| JP | 2007-197538 | * 8/2007 | ............. C09B 33/12 |
| JP | 2007-197538 A | 8/2007 | |
| JP | 2010-31224 A | 2/2010 | |
| JP | 4810123 B2 | 11/2011 | |
| WO | 2005/075573 A1 | 8/2005 | |
| WO | 2006/082669 A1 | 8/2006 | |

OTHER PUBLICATIONS

Horiki Shibata, et al., "Four Different Crystals Derived from a Novel Yellow Pyrazol Azo Pigment", Journal of Imaging Science and Technology, vol. 55, No. 2, Mar. 2011, pp. 020504-1 to 020504-6.

International Preliminary Report on Patentability, International Application No. PCT/JP2013/004932, Mailing Date Mar. 5, 2015.

* cited by examiner

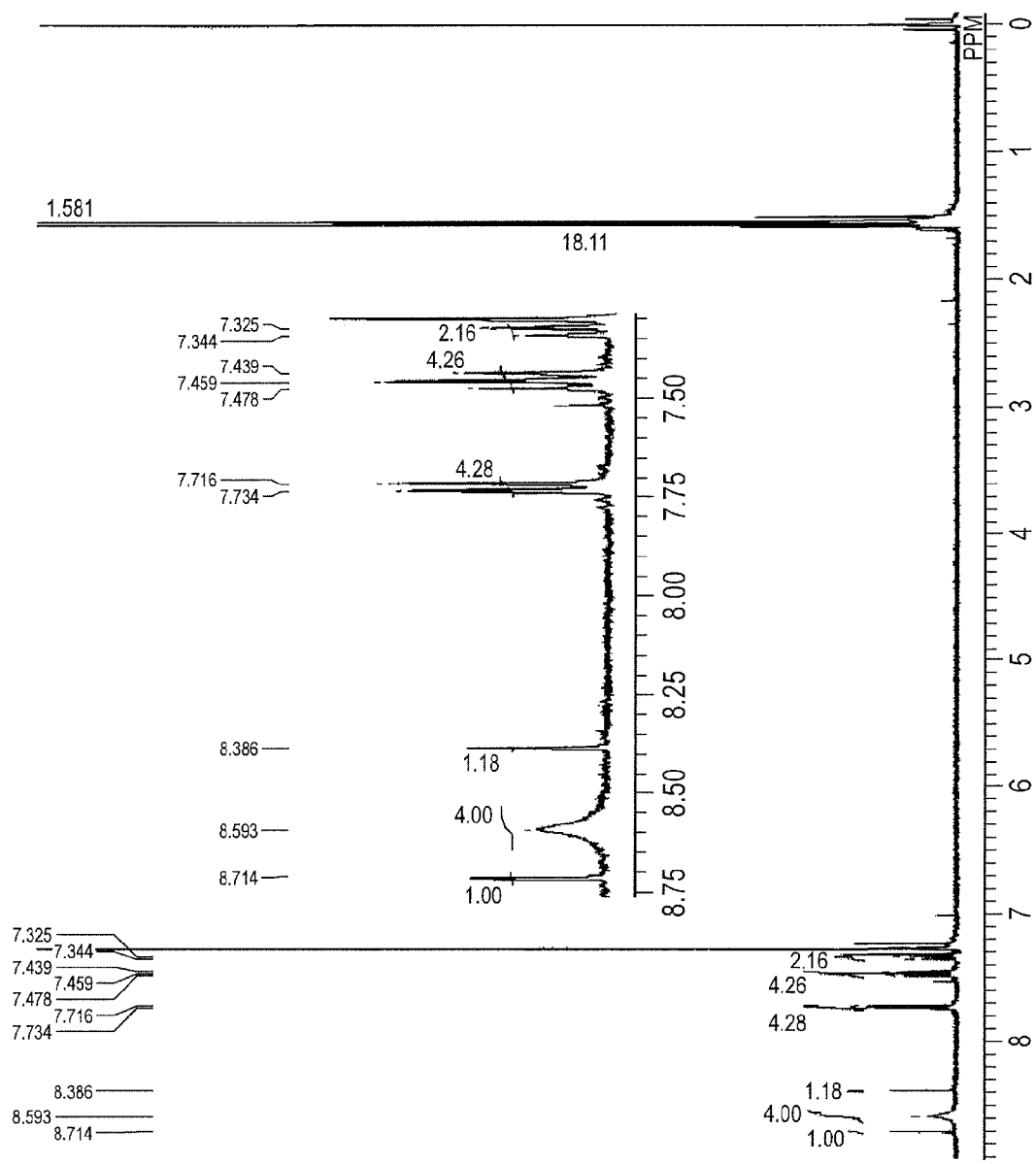

YELLOW TONER AND METHOD FOR PRODUCING THE YELLOW TONER

CROSS-REFERENCE TO RELATED APPLICATIONS

This application is a continuation of International Application No. PCT/JP2013/004932, filed on Aug. 21, 2013, which claims the benefit of Japanese Patent Application No. 2012-184756, filed on Aug. 24, 2012.

BACKGROUND OF THE INVENTION

1. Field of the Invention

The present invention relates to yellow toners used in recording methods such as electrophotographies, electrostatic recording methods, magnetic recording methods, and toner jet methods, and image forming apparatuses using the yellow toners.

2. Description of the Related Art

In recent years, color images have spread widely and the demand for high-quality images has been raised. In digital full-color copying machines and printers, color-image manuscripts are color-separated by each color filter of blue, green, and red, and thereafter, latent images corresponding to the original images are developed using each color developer of yellow, magenta, cyan, and black. Therefore, the coloring power of a coloring agent in the each color developer resultantly largely affects the image quality.

The reproduction of color spaces including the Japan Color in print industries and AdobeRGB in DeskTop Publishing (DTP) is becoming important. For the reproduction of the color spaces, a method is known in which a dye having a broad color gamut is used in addition to improvement of dispersibility of a pigment.

Typical examples known as yellow coloring agents for toners are isoindolinone, quinophthalone, isoindoline, anthraquinone, and compounds having an azo skeleton or the like.

Recently, examples are disclosed which use a pyrazole skeleton excellent in color properties and excellent in light resistance (see Patent Literatures 1 to 3).

CITATION LIST

Patent Literature

PTL 1: Japanese Patent Application Laid-Open No. S61-112160
PTL 2: Japanese Patent No. 4810123
PTL 3: Japanese Patent Application Laid-Open No. 2010-31224

SUMMARY OF THE INVENTION

In the case of using a compound having a pyrazole skeleton as a coloring material for a toner, a yellow toner excellent in color development can be obtained. However, color development, chroma, and light resistance still have room for improvements.

Thus, the present invention is directed to providing a yellow toner much more improved in color development and chroma and much more improved in light resistance, and a method for producing the yellow toner.

Solution to Problem

According to one aspect of the present invention, there is provided a yellow toner containing a binder resin, a wax, and a coloring agent, wherein the coloring agent contains a compound represented by the following general formula (1).

General formula (1)

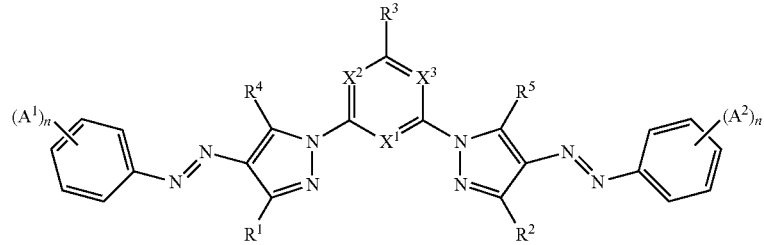

wherein $R^1$ and $R^2$ each independently represent a hydrogen atom, an alkyl group, or an aryl group; $R^3$ represents a hydrogen atom, an alkyl group, an aryl group, an alkoxy group, or a hydroxy group; $R^4$ and $R^5$ each independently represent a hydrogen atom or an amino group; $X^1$ to $X^3$ each independently represent a carbon atom or a nitrogen atom; $A^1$ and $A^2$ each independently represent a hydrogen atom, an alkyl group, an alkoxy group, an aryl group, a carbamoyl group, a carboxylate ester group, a carboxylic acid amide group, a sulfonate ester group, a sulfonic acid amide group, a trifluoromethyl group, a cyano group, a hydroxy group, a nitro group, an amino group or a halogen atom; and n represents an integer of 1 to 5.

According to another aspect of the present invention, there is provided a method for producing a yellow toner comprising the steps of suspension-polymerizing a polymerizable monomer in a polymerizable monomer composition containing the polymerizable monomer and the coloring agent represented by the general formula (1) in an aqueous medium.

According to further aspect of the present invention, there is provided a method for producing a yellow toner comprising the steps of:
emulsion-aggregating resin particles and particles of the coloring agent represented by the general formula (1) in an aqueous medium.

According to still further aspect of the present invention, there is provided a method for producing a yellow toner comprising the steps of kneading a resin and the coloring agent represented by the general formula (1), and pulverizing the kneaded material.

The present invention can provide a yellow toner much more improved in color development and chroma and much more improved in light resistance.

Further features of the present invention will become apparent from the following description of exemplary embodiments with reference to the attached drawings.

BRIEF DESCRIPTION OF THE DRAWINGS

FIG. 1 is a diagram illustrating a $^1$H NMR spectrum of a compound (1) represented by the general formula (1) in CDCl$_3$ at room temperature at 400 MHz.

DESCRIPTION OF THE EMBODIMENTS

Preferred embodiments of the present invention will now be described in detail in accordance with the accompanying drawings.

Hereinafter, the present invention will be described in more detail.

The present inventors have exhaustively studied to achieve the above objects. As a result, it has been found that a compound having a structure represented by the following general formula (1) is excellent in color development of yellow, has good extension of chroma and is excellent in light resistance.

General formula (1)

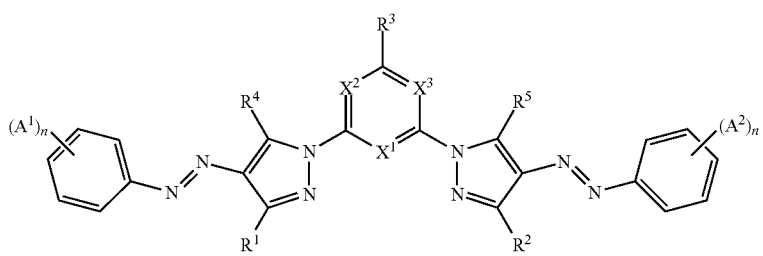

wherein:
$R^1$ and $R^2$ each independently represent a hydrogen atom, an alkyl group, or an aryl group;
$R^3$ represents a hydrogen atom, an alkyl group, an aryl group, an alkoxy group, or a hydroxy group;
$R^4$ and $R^5$ each independently represent a hydrogen atom or an amino group;
$X^1$ to $X^3$ each independently represent a carbon atom or a nitrogen atom;
$A^1$ and $A^2$ each independently represent a hydrogen atom, an alkyl group, an alkoxy group, an aryl group, a carbamoyl group, a carboxylate ester group, a carboxylic acid amide group, a sulfonate ester group, a sulfonic acid amide group, a trifluoromethyl group, a cyano group, a hydroxy group, a nitro group, an amino group, or a halogen atom; and n represents an integer of 1 to 5.

First, dye compounds represented by the formula (1) will be described.

$R^1$ and $R^2$ in the general formula (1) represent a hydrogen atom, an alkyl group, or an aryl group.

The alkyl group for $R^1$ and $R^2$ in the general formula (1) is not especially limited, but includes primary to tertiary alkyl groups having 1 to 20 carbon atoms. Specific examples thereof include saturated or unsaturated straight-chain, branched or cyclic primary to tertiary alkyl groups having 1 to 20 carbon atoms such as a methyl group, an ethyl group, a n-propyl group, an isopropyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, 2-ethylpropyl group, 2-ethylhexyl group, and a cyclohexenylethyl group.

The aryl group for $R^1$ and $R^2$ in the general formula (1) is not especially limited, but examples thereof include a phenyl group, a methylphenyl group, and a dimethylphenyl group.

$R^3$ in the general formula (1) represents a hydrogen atom, an alkyl group, an aryl group, an alkoxy group, or a hydroxy group.

The alkyl group for $R^3$ in the general formula (1) is not especially limited, but examples thereof include saturated or unsaturated straight-chain, branched or cyclic primary to tertiary alkyl groups having 1 to 20 carbon atoms such as a methyl group, an ethyl group, a n-propyl group, an isopropyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, 2-ethylpropyl, 2-ethylhexyl group, and a cyclohexenylethyl group.

The aryl group for $R^3$ in the general formula (1) is not especially limited, but examples thereof include a phenyl group, a methylphenyl group, and a dimethylphenyl group.

The alkoxy group for $R^3$ in the general formula (1) is not especially limited, but examples thereof include a methoxy group, an ethoxy group, a propoxy group, and a butoxy group.

$R^4$ and $R^5$ in the general formula (1) each independently represent a hydrogen atom or an amino group.

The amino group for $R^4$ and $R^5$ in the general formula (1) is not especially limited, but examples thereof include, in addition to an amino group, di-substituted amino groups such as a dimethylamino group, a diethylamino group, and a di(ethylhexyl)amino group, and mono-substituted amino groups such as an acylamino group, a diacylamino group, and a benzoylamino group.

$X^1$ to $X^3$ in the general formula (1) each independently represent a carbon atom or a nitrogen atom.

That is, a 6-membered ring formed by $X^2$ to $X^3$ and three carbon atoms in the general formula (1) is one of a benzene ring, a pyridine ring, a pyrimidine ring and a triazine ring.

As combinations of $X^1$ to $X^3$, particularly the following cases are especially preferable from the viewpoint of much more improvement in chroma and light resistance of dye compounds.

A case where $X^1$ is a carbon atom and $X^2$ and $X^3$ are each a nitrogen atom.

A case where $X^1$ to $X^3$ are each a nitrogen atom.

$A^1$ and $A^2$ in the general formula (1) each independently represent an alkyl group, an alkoxy group, an aryl group, a carbamoyl group, a carboxylate ester group, a carboxylic acid amide group, a sulfonate ester group, a sulfonic acid amide group, a cyano group, a hydroxy group, a nitro group, an amino group, or a halogen atom.

The alkyl group for $A^1$ and $A^2$ in the general formula (1) is not especially limited, but examples thereof include saturated or unsaturated straight-chain, branched or cyclic primary to tertiary alkyl groups having 1 to 20 carbon atoms such as a methyl group, an ethyl group, a n-propyl group, an isopropyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, 2-ethylpropyl group, 2-ethylhexyl group, and a cyclohexenylethyl group.

The alkoxy group for $A^1$ and $A^2$ in the general formula (1) is not especially limited, but examples thereof include a methoxy group, an ethoxy group, a propoxy group, and a butoxy group.

The aryl group for $A^1$ and $A^2$ in the general formula (1) is not especially limited, but examples thereof include a phenyl group, a methylphenyl group, and a dimethylphenyl group.

The carboxylate ester group for $A^1$ and $A^2$ in the general formula (1) is not especially limited, but examples thereof include a methyl carboxylate group, an ethyl carboxylate group, a butyl carboxylate ester group, and an ethylhexyl carboxylate ester group.

The carboxylic acid amide group for $A^1$ and $A^2$ in the general formula (1) is not especially limited, but examples thereof include carboxylic acid dialkylamide groups such as a carboxylic acid dimethylamide group, a carboxylic acid diethylamide group, and a carboxylic acid di(ethylhexyl)amide group, and carboxylic acid monoalkyl amide groups such as a carboxylic acid methylamide group, a carboxylic acid ethylamide group, and a carboxylic acid ethylhexylamide group.

The sulfonate ester group for $A^1$ and $A^2$ in the general formula (1) is not especially limited, but examples thereof include a methyl sulfonate ester group, an ethyl sulfonate ester group, a propyl sulfonate ester group, and a butyl sulfonate ester group.

The sulfonic acid amide group for $A^1$ and $A^2$ in the general formula (1) includes sulfonic acid dialkylamide groups such as a sulfonic acid dimethylamide group, and a sulfonic acid diethylamide group, and sulfonic acid monoalkylamide groups such as a sulfonic acid methylamide group, a sulfonic acid ethylamide group, and a sulfonic acid ethylhexylamide group.

The amino group for $A^1$ and $A^2$ in the general formula (1) is not especially limited, but examples thereof include, in addition to an amino group, di-substituted amino groups such as a dimethylamino group, a diethylamino group, and a di(ethylhexyl)amino group, and mono-substituted amino groups such as an acylamino group, a diacylamino group, and a benzoylamino group.

The halogen atom for $A^1$ and $A^2$ in the general formula (1) is not especially limited, but examples thereof include a fluorine atom, a chlorine atom, a bromine atom, and an iodine atom.

Cases where the substituents for $A^1$ and $A^2$ in the general formula (1) are a carboxylate ester group, a carboxylic acid amide group, a sulfonate ester group, and a sulfonic acid amide group are especially preferable because of high chroma and excellent light resistance.

n in the general formula (1) represents 1 to 5, and substituents of an optional number in the range of 1 to 5 can be incorporated at optional positions.

Dye compounds represented by the general formula (1) can be synthesized based on known methods described, for example, in Journal of Imaging Science and Technology, Volume 55, Number 2, 1 March 2011, pp. 20504-1 to 20504-6 (6).

As preferable specific examples of dye compounds according to the present invention, dye compounds (1) to (45) are shown hereinafter, but dye compounds are not limited to the following examples.

Compound (1)

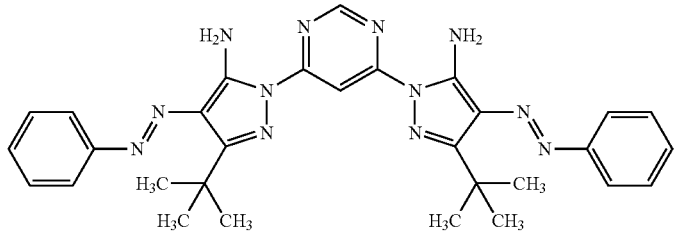

Compound (2)

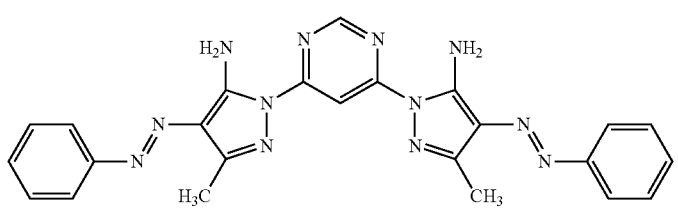

Compound (3)

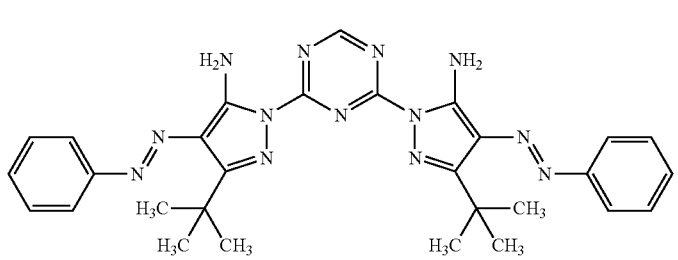

-continued
Compound (4)
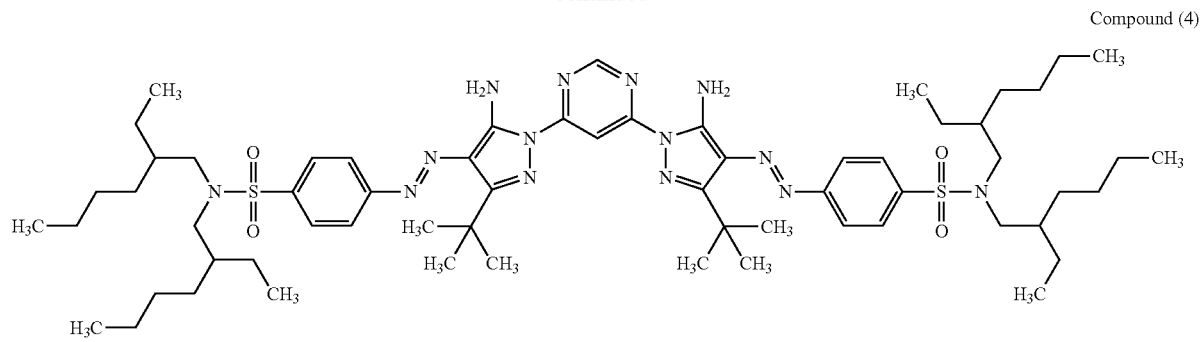
Compound (5)
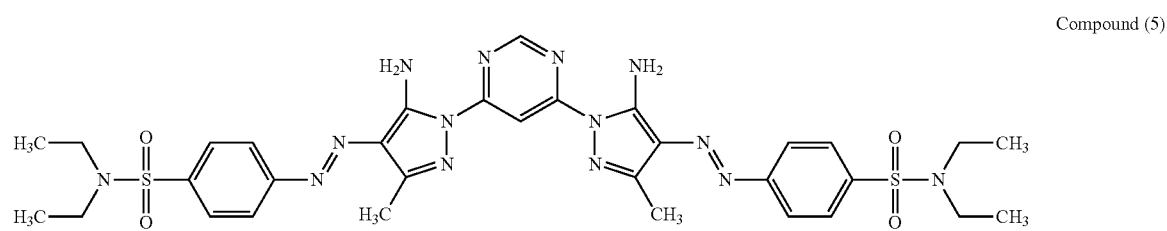
Compound (6)
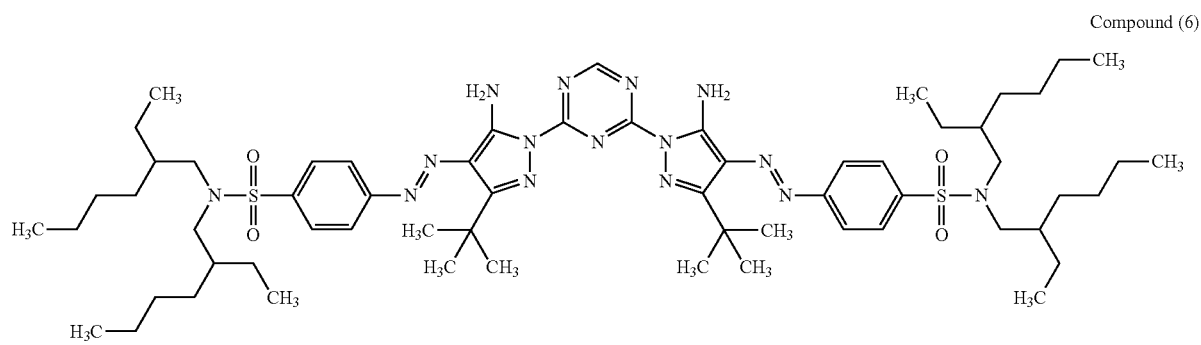
Compound (7)
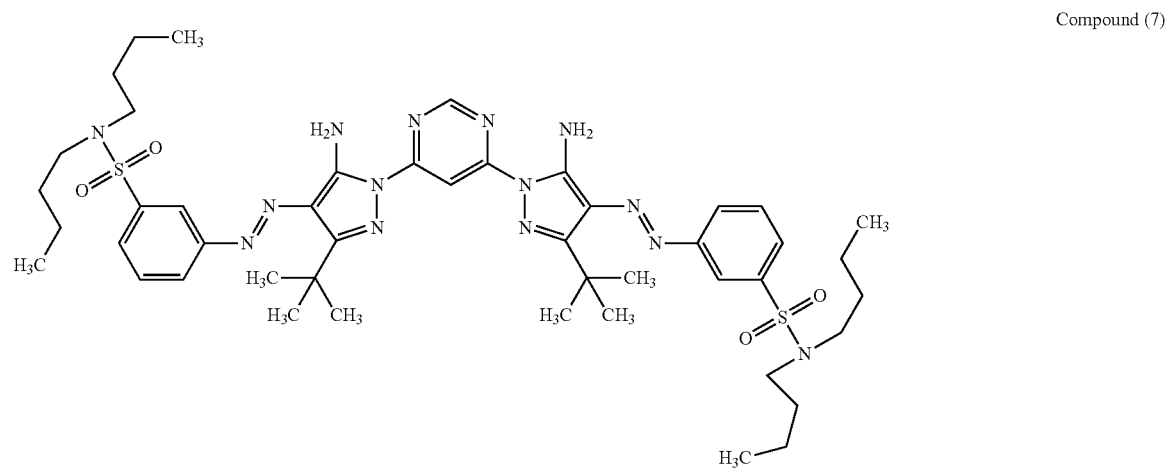

Compound (8)
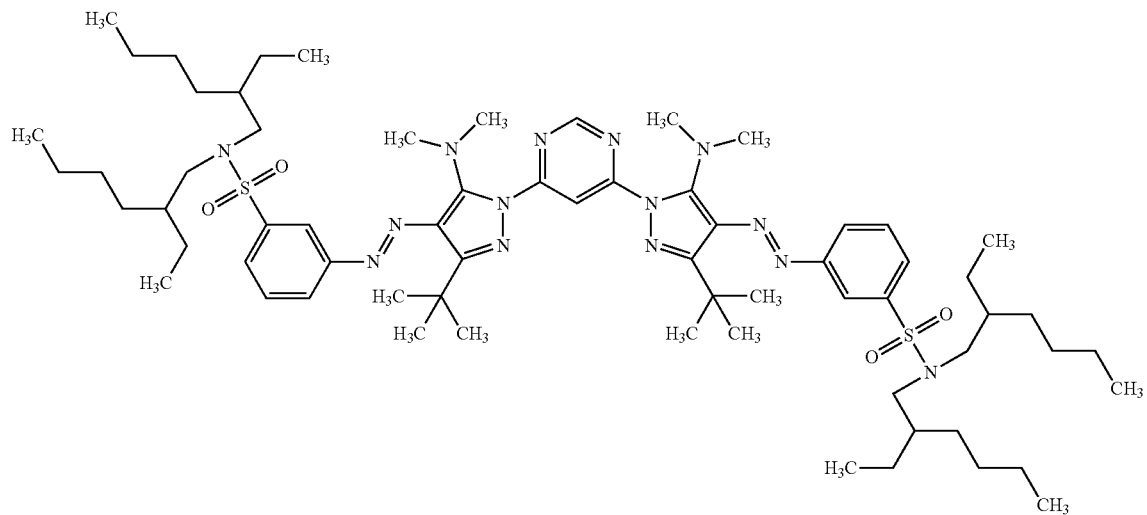
Compound (9)
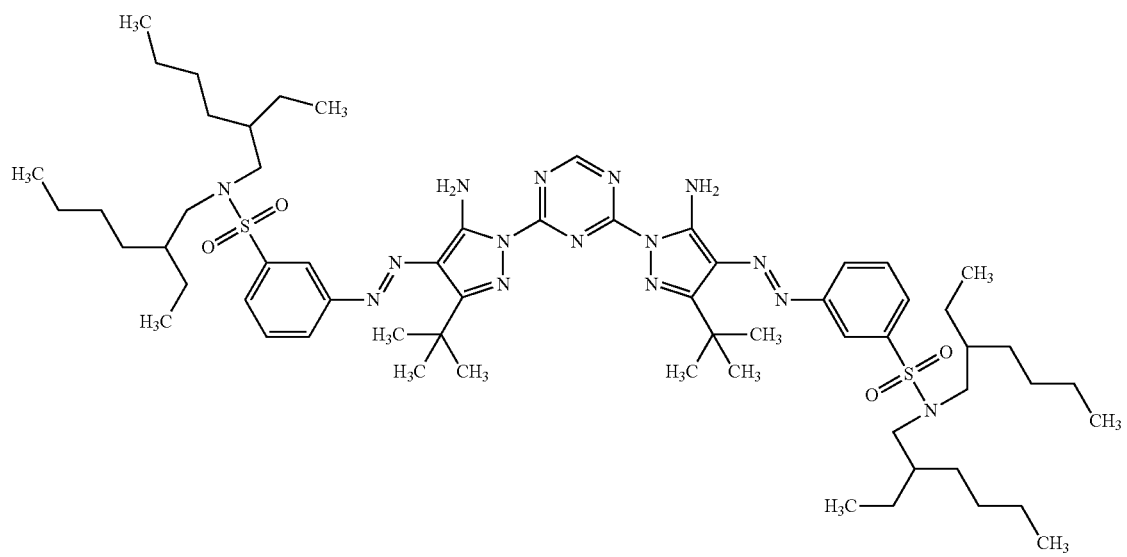
Compound (10)
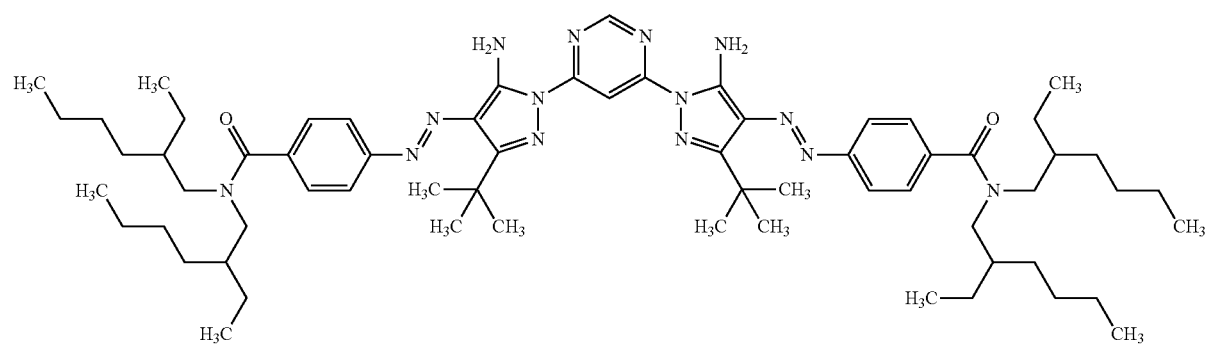

-continued
Compound (11)
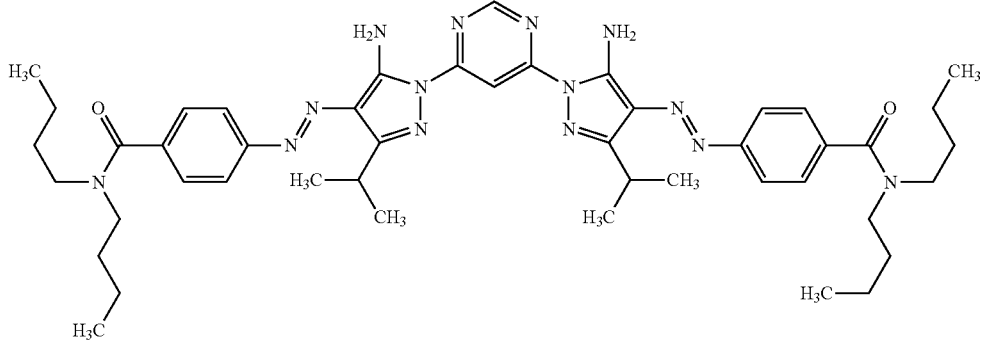
Compound (12)
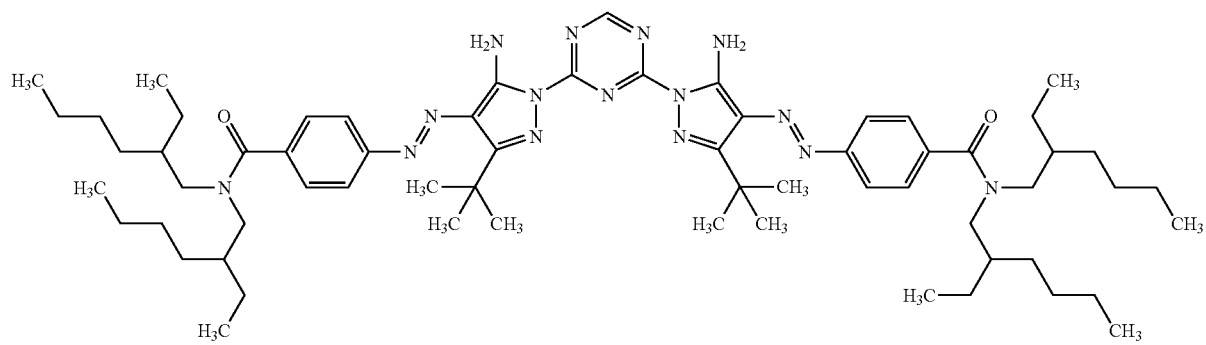
Compound (13)
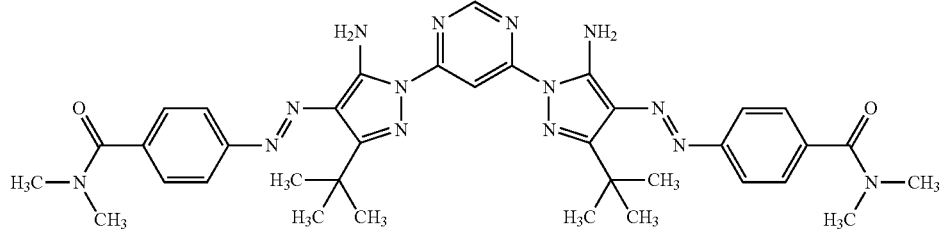
Compound (14)
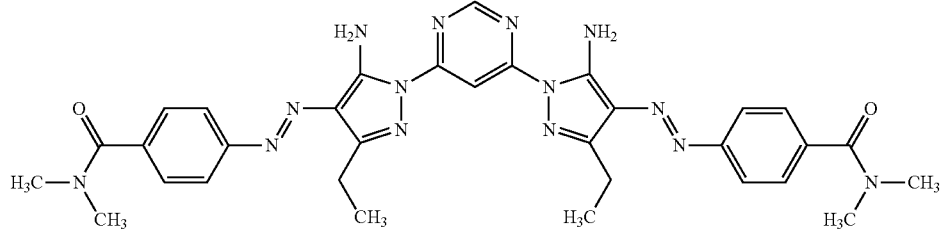
Compound (15)
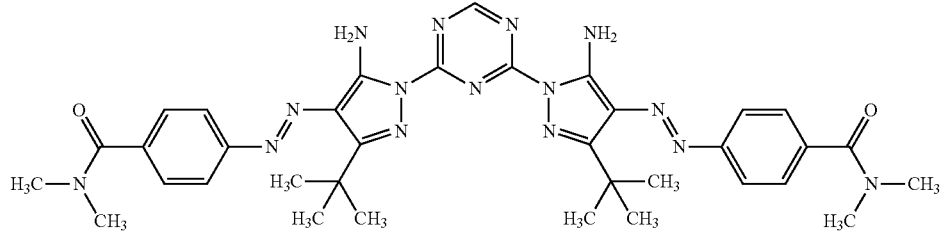

Compound (16)
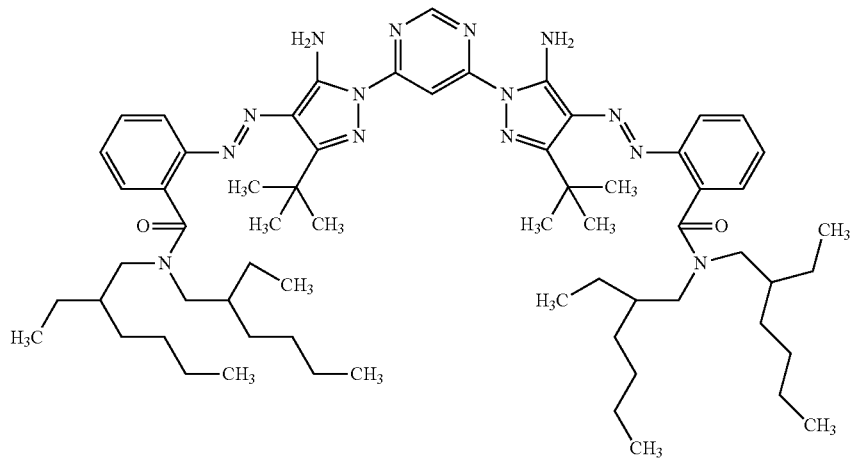
Compound (17)
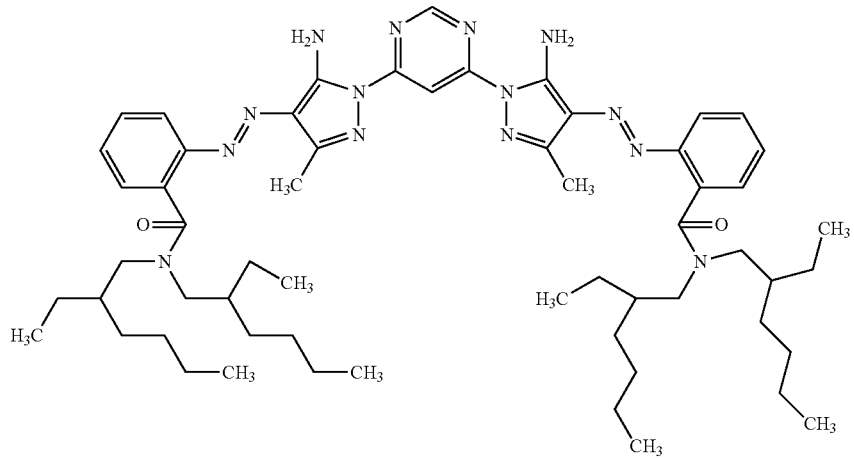
Compound (18)
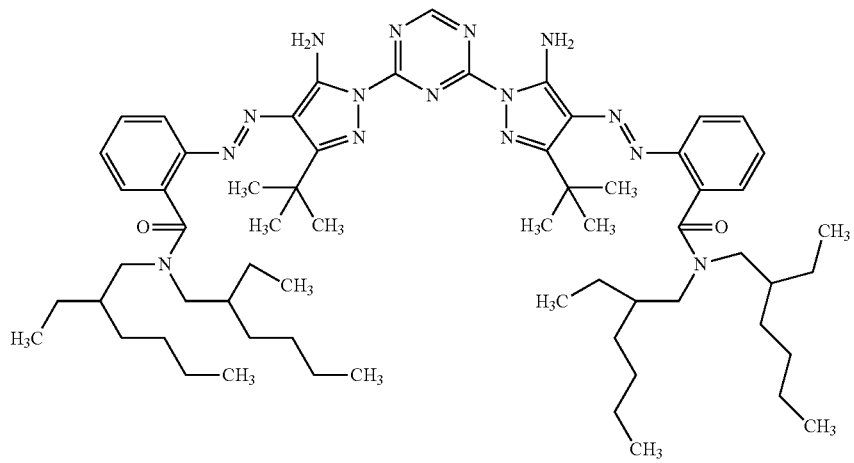

-continued
Compound (19)
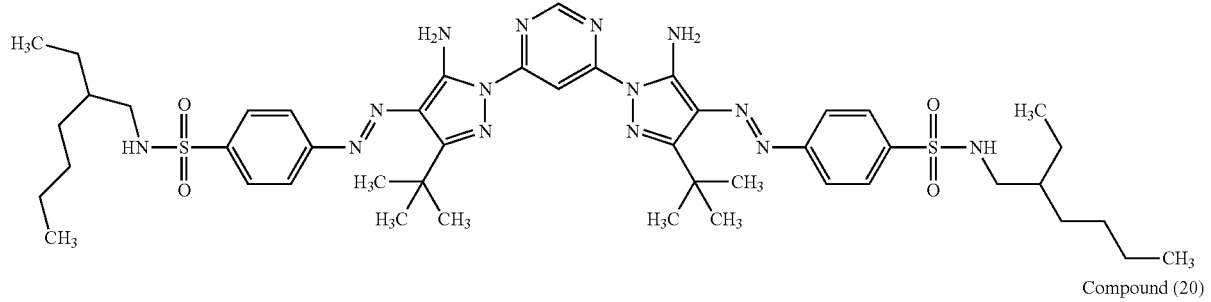
Compound (20)
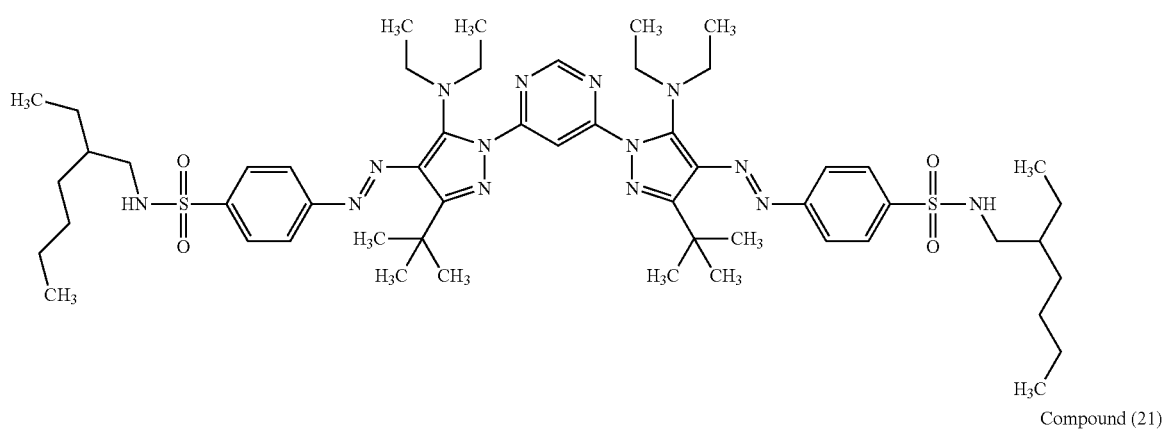
Compound (21)
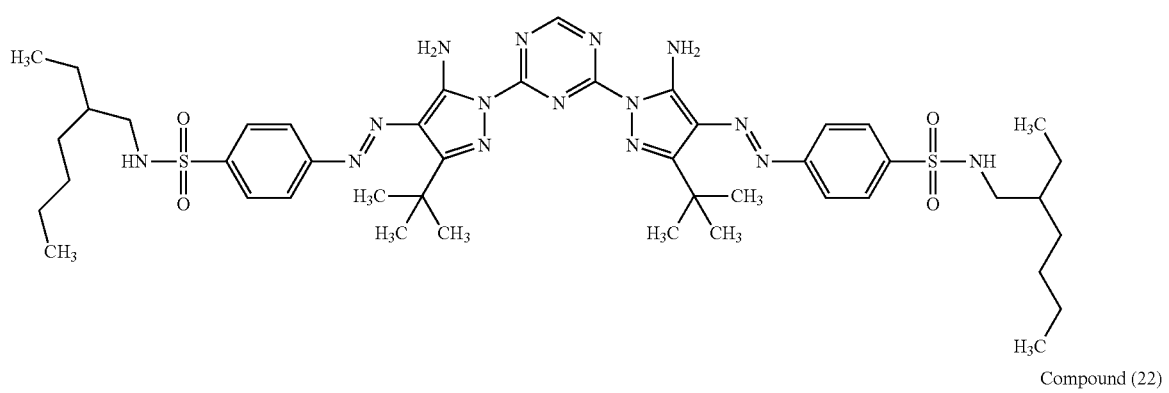
Compound (22)
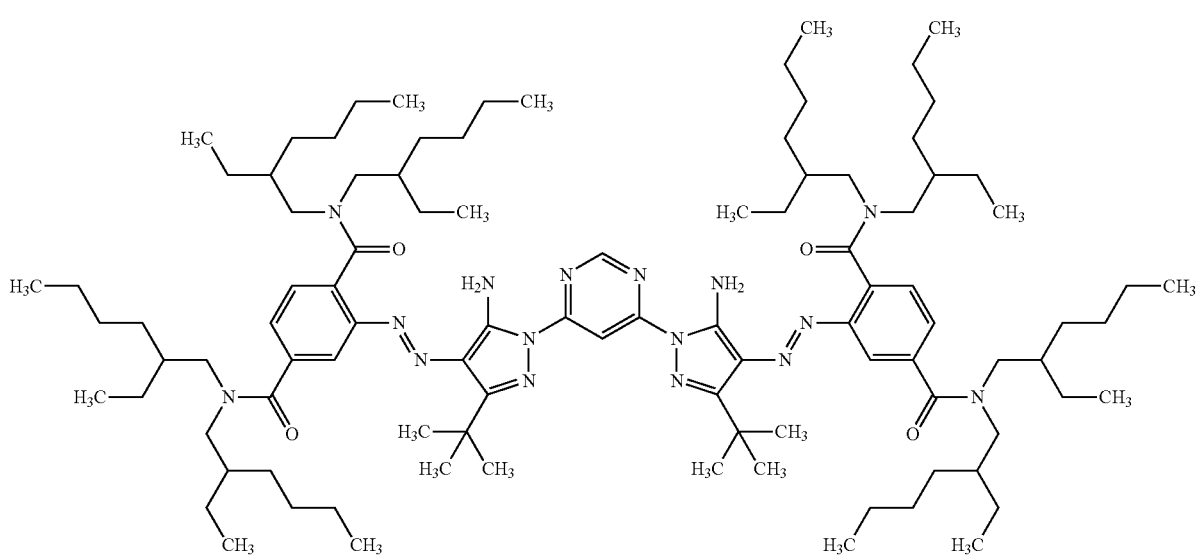

Compound (23)
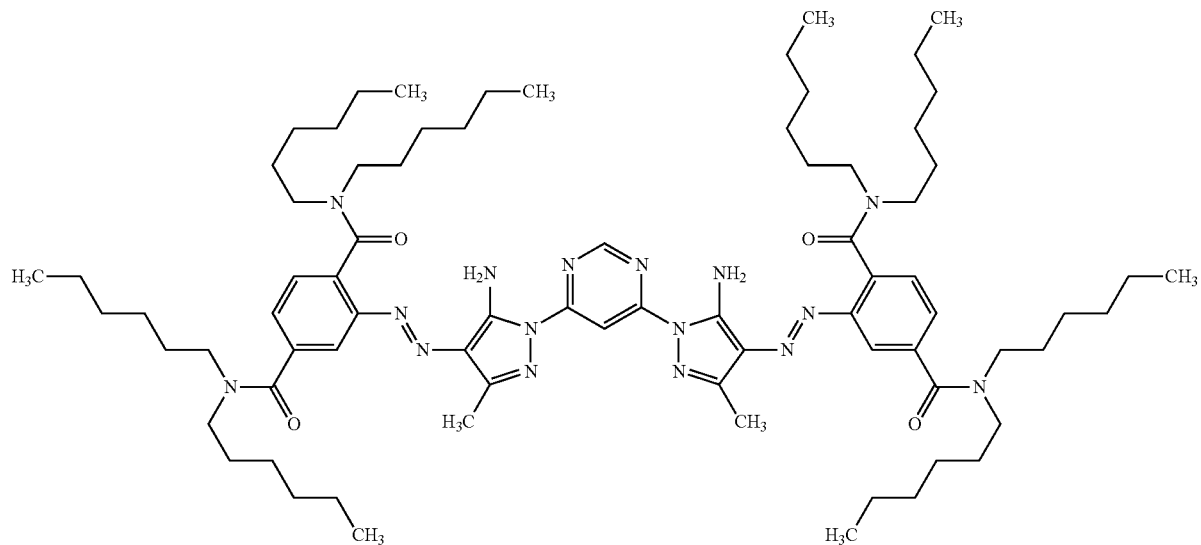
Compound (24)
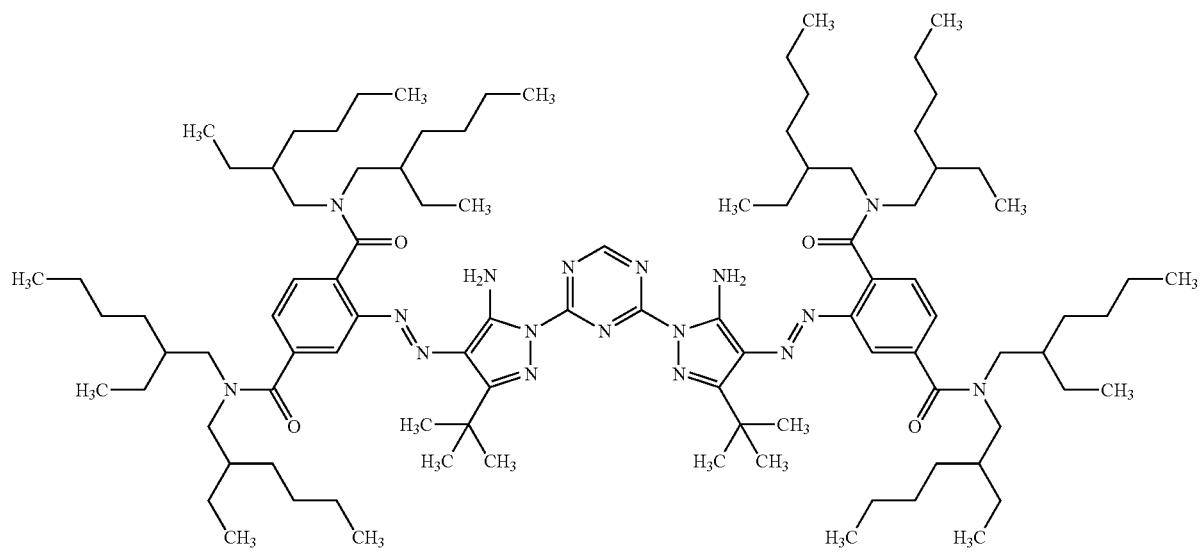
Compound (25)
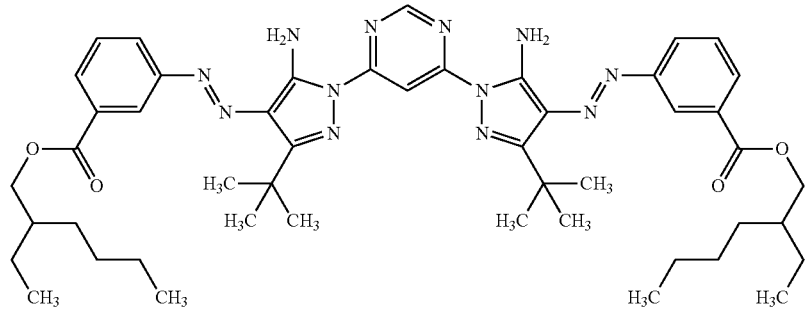

-continued
Compound (26)
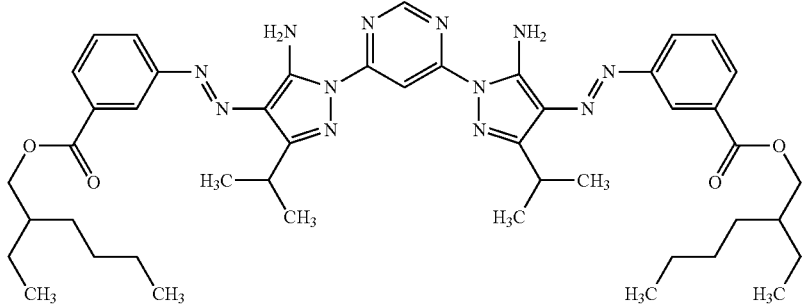
Compound (27)
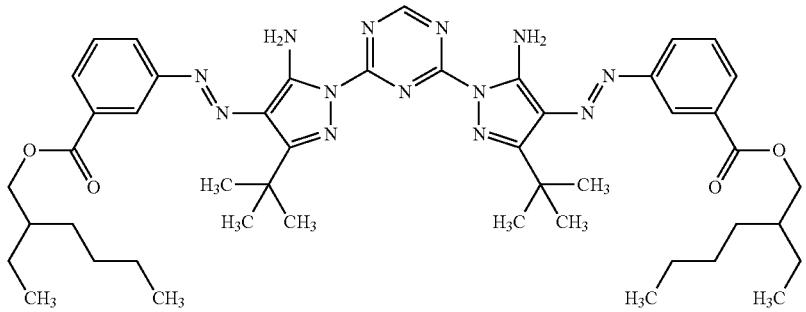
Compound (28)
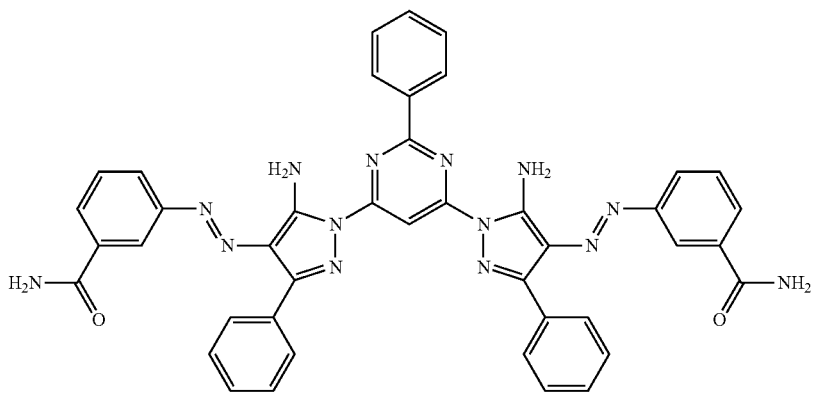
Compound (29)
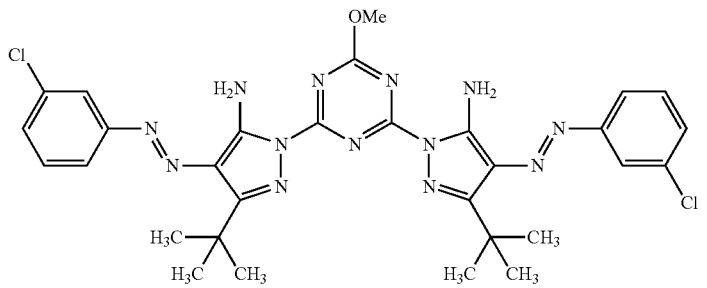
Compound (30)
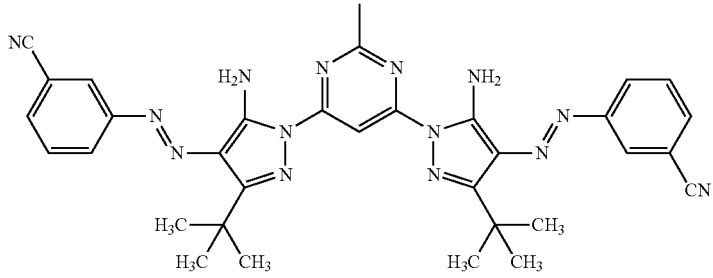

Compound (31)
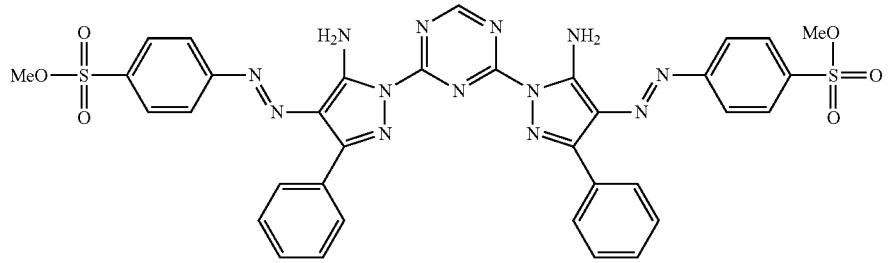
Compound (32)
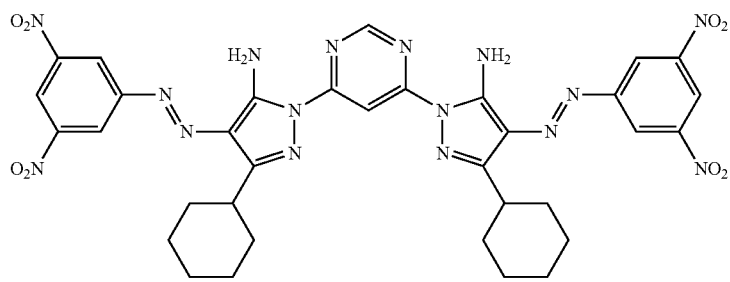
Compound (33)
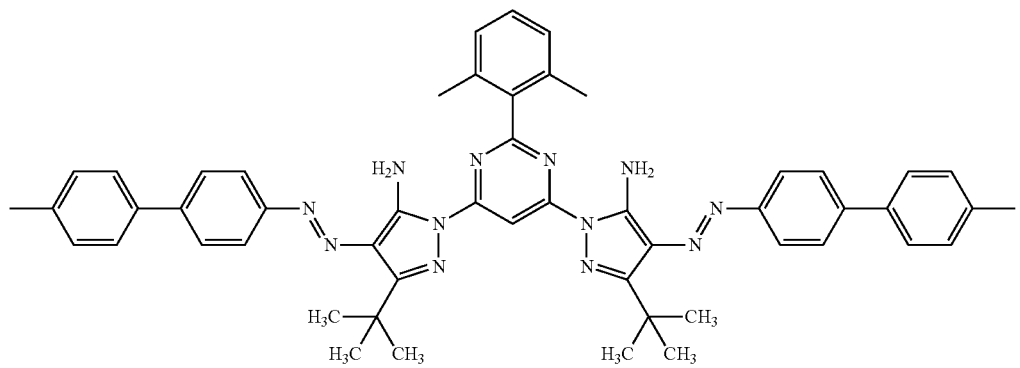
Compound (34)
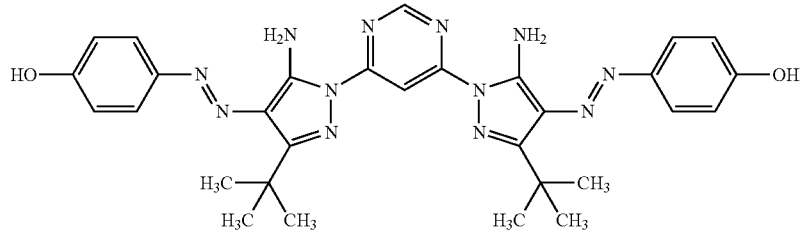
Compound (35)
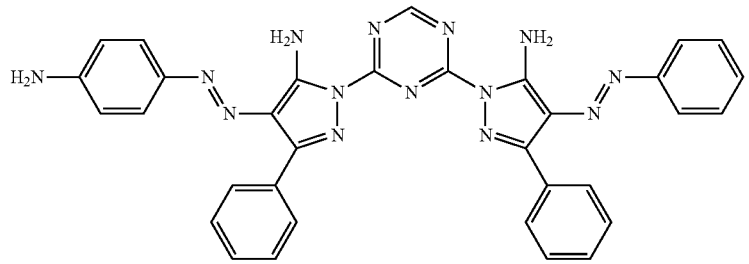

-continued
Compound (36)
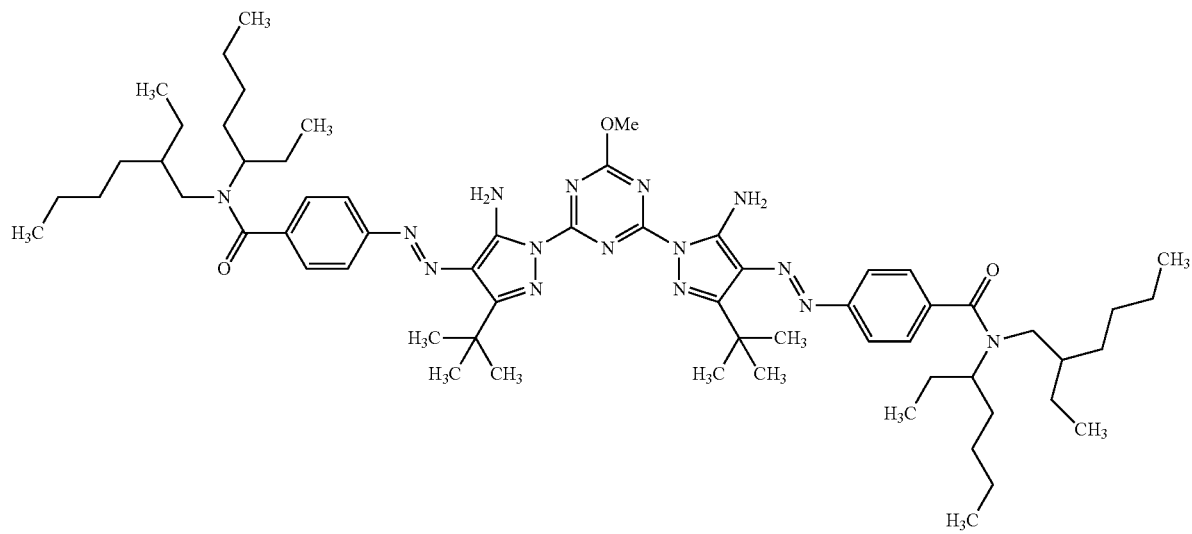
Compound (37)
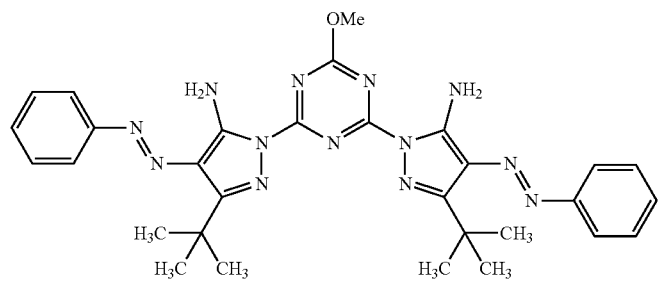
Compound (38)
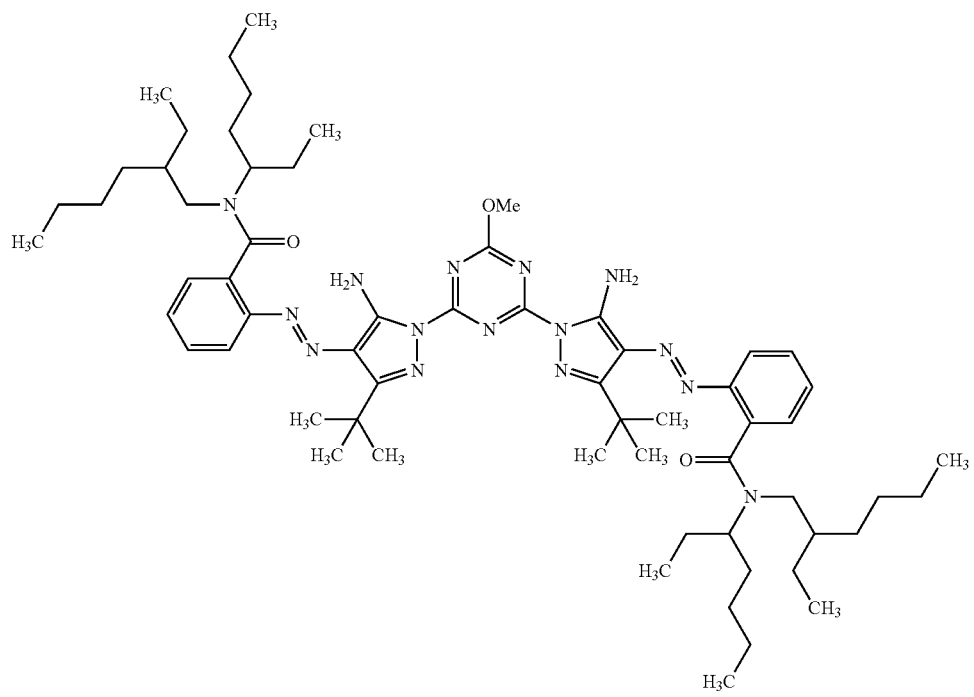

-continued
Compound (39)
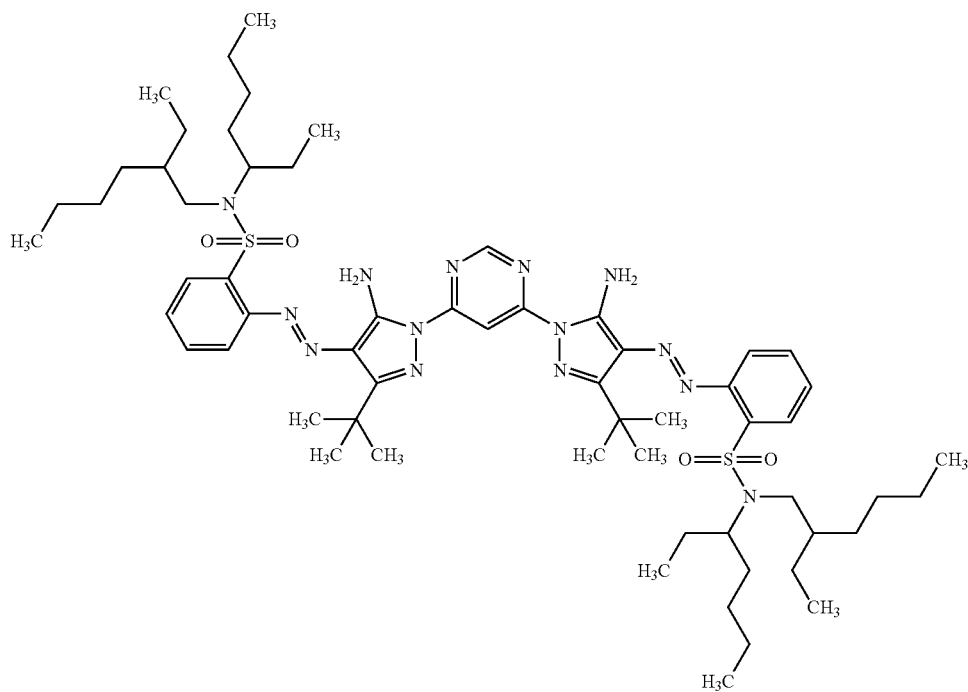
Compound (40)
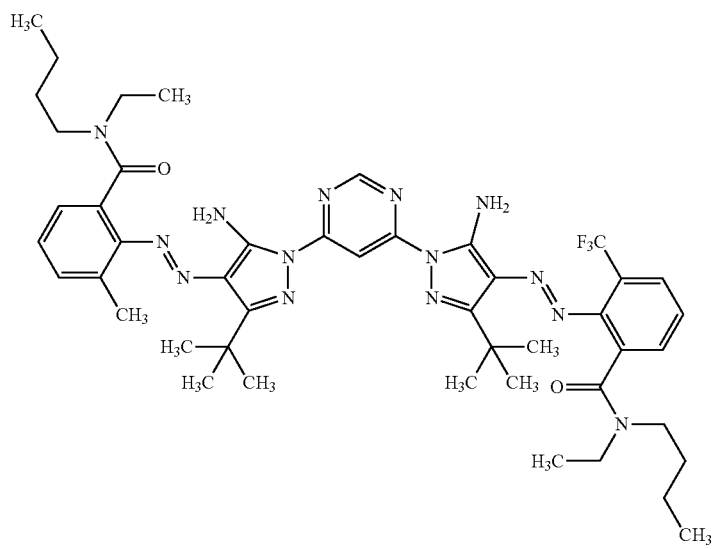

Compound (41)
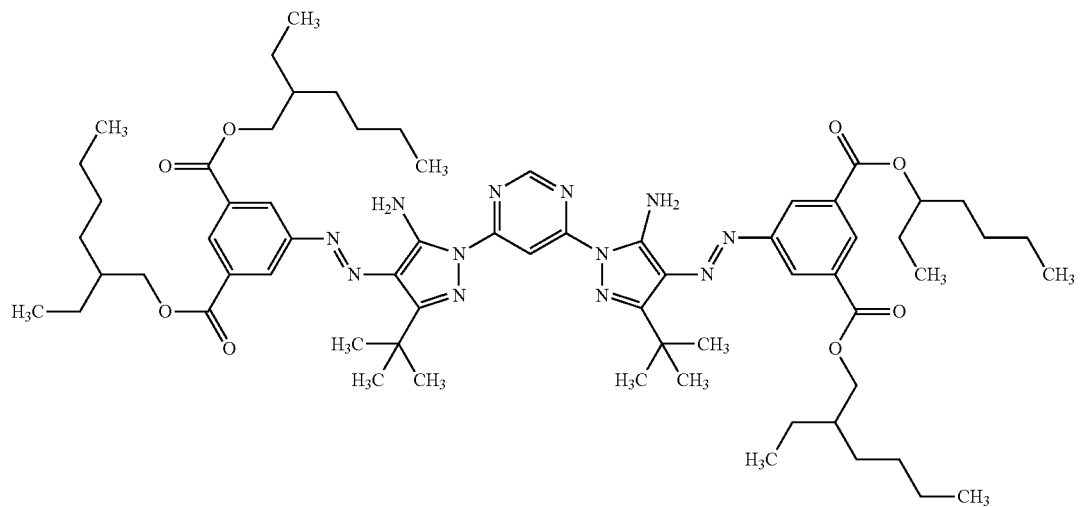
Compound (42)
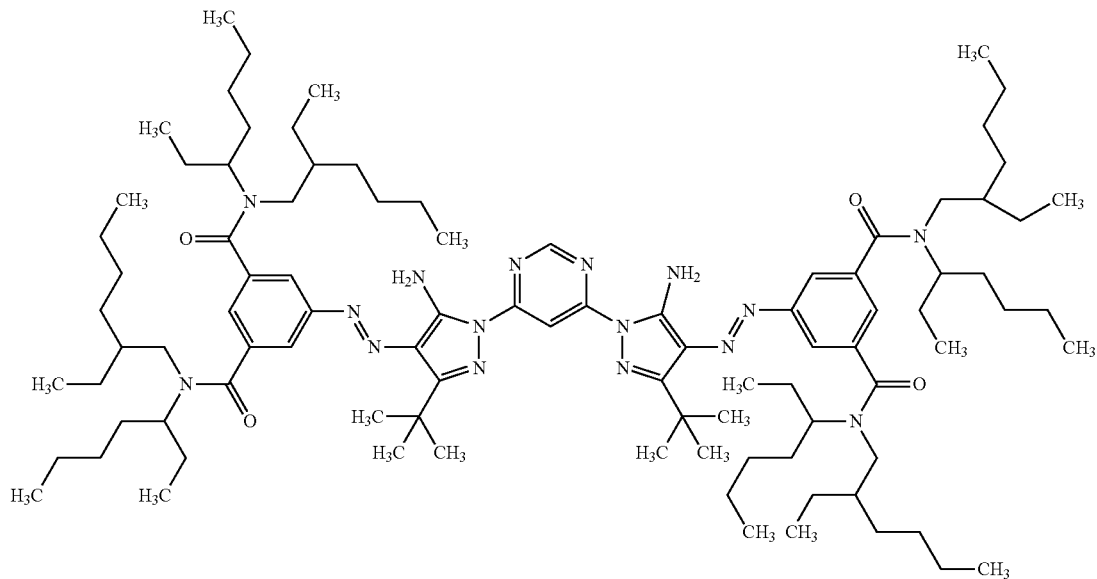

-continued

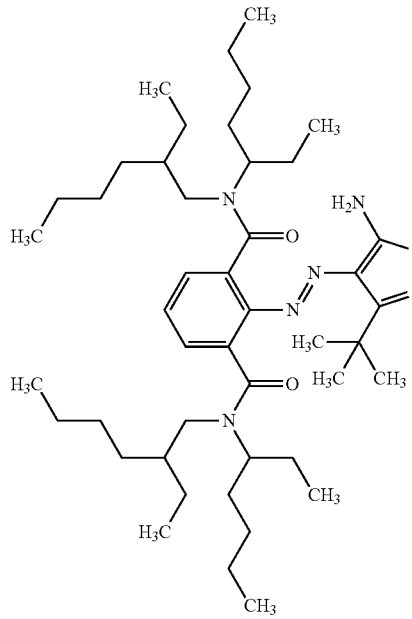

Compound (43)

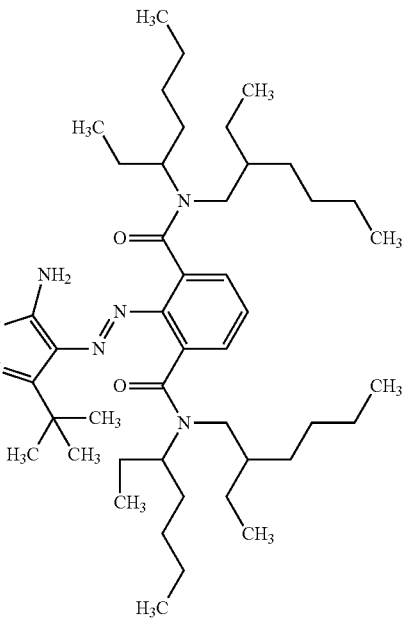

Compound (44)

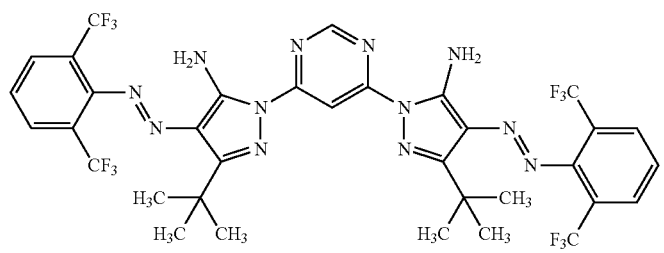

Compound (45)

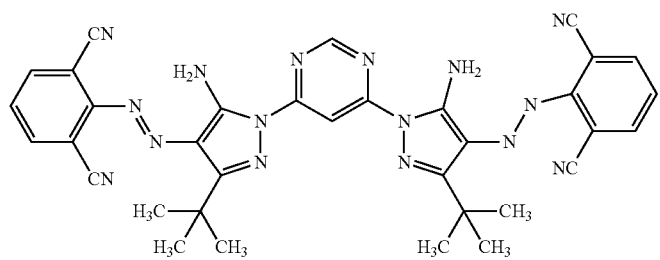

Compounds represented by the above general formula (1) used in the present invention may be used singly or in combination with a known yellow dye compound according to production units of each toner.

Then, the toners according to the present invention will be described.

First, constituting materials of the toners according to the present invention will be described.

<About Binder Resins>

Binder resins used for the toners according to the present invention are not especially limited, but examples thereof include thermoplastic resins.

The binder resins specifically include homopolymers or copolymers (styrene-based resins) of styrenes, such as styrene, p-chlorostyrene, and α-methylstyrene; homopolymers or copolymers (vinyl-based resins) of esters having a vinyl group, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; homopolymers or copolymers (vinyl-based resins) of vinylnitriles, such as acrylonitrile and methacrylonitrile; homopolymers or copolymers (vinyl-based resins) of vinyl ethers, such as vinyl ethyl ether and vinyl isobutyl ether; homopolymers or copolymers (vinyl-based resins) of vinyl ketones, such as vinyl methyl ketone, vinyl ethyl ketone, and vinyl isopropenyl ketone; homopolymers or copolymers (olefin-based resins) of olefins, such as ethylene, propylene, butadiene, and isoprene; and non-vinyl condensed resins such as epoxy resins, polyester resins, polyurethane resins, polyamide resins, cellulosic resins, and polyether resins, and graft polymers of these non-vinyl condensed resins and vinylic monomers. Polyester resins are preferable. These resins may be used singly or used concurrently in two or more.

The above polyester resin is synthesized from a constituent (dicarboxylic acid) originated from an acid and a constituent (diol) originated from an alcohol. In the present invention, "a constituent originated from an acid" refers to a constituting site which was an acid component before the synthesis of the polyester resin. "A constituent originated from an alcohol" refers to a constituting site which was an alcohol component before the synthesis of the polyester resin.

The above constituent originated from an acid is not especially limited, but includes constituents originated from aliphatic dicarboxylic acids, constituents originated from dicarboxylic acids having a double bond, and constituents originated from dicarboxylic acids having a sulfonic acid group. The constituent originated from an acid specifically includes oxalic acid, malonic acid, succinic acid, glutaric acid, adipic acid, pimelic acid, suberic acid, azelaic acid, sebacic acid, 1,9-nonanedicarboxylic acid, 1,10-deccanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, 1,18-octadecanedicarboxylic acid, and lower alkyl esters and acid anhydrides thereof. Particularly constituents originated from aliphatic dicarboxylic acids are desirable, and that aliphatic sites in the aliphatic dicarboxylic acids are saturated carboxylic acids is more preferable.

On the other hand, the above constituents originated from an alcohol are not especially limited, but are desirably aliphatic diols. Examples thereof include ethylene glycol, 1,3-propanediol, 1,4-butanediol, 1,5-pentanediol, 1,6-hexanediol, 1,7-heptanediol, 1,8-octanediol, 1,9-nonanediol, 1,10-deccanediol, 1,11-dodecanediol, 1,12-undecanediol, 1,13-tridecanediol, 1,14-tetradecanediol, 1,18-octadecanediol, and 1,20-eicosanediol.

In the present invention, in order to raise the mechanical strength of a toner particle and control the molecular weight of a toner molecule, a crosslinking agent may be used in the synthesis time of a binder resin.

The crosslinking agent used for the toner according to the present invention is not especially limited, but examples thereof include, as bifunctional crosslinking agents, divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylates, polyester-type diacrylates, and dimethacrylates corresponding to the above diacrylates.

The polyfunctional crosslinking agent is not especially limited, but examples thereof include pentaerythritol triacrylate, trimethylolethane triacrylate, trimethylolpropane triacrylate, tetramethylolmethane tetraacrylate, acrylates of oligoesters, methacrylates of the oligoesters, 2,2-bis(4-methacryloxyphenyl)propane, diallyl phthalate, triallyl cyanurate, triallyl isocyanurate, and triallyl trimellitate.

The content of a crosslinking agent can be 0.05 to 10 parts by mass, and is more preferably 0.1 to 5 parts by mass, with respect to 100 parts by mass of the above binder resin, from the viewpoint of the fixability and the offset resistance of a toner.

<About Wax Components>

Waxes mean materials used in order to prevent the offset in the toner fixing time.

Wax components usable in the present invention are not especially limited. Specific examples thereof are as follows.

Paraffin waxes, microcrystalline waxes, petroleum-based waxes such as petrolatums and derivatives thereof.

Montan waxes and derivatives thereof.

Hydrocarbon waxes by Fischer-Tropsch process and derivatives thereof.

Polyolefin waxes represented by polyethylenes, and derivatives thereof.

Natural waxes such as carnauba waxes and candelilla waxes, and derivatives thereof, and the like.

Here, the above "derivative" includes oxides, block copolymers with a vinyl monomer, and graft modified materials as well.

The wax components also include alcohols such as higher aliphatic alcohols, aliphatic acids such as stearic acid and palmitic acid and compounds thereof, acid amides, esters, ketones, hardened castor oils, and derivatives thereof, plant waxes, and animal waxes. These can be used singly or used concurrently in two or more.

The total amount of wax components added can be 2.5 to 15 parts by mass, and is more preferably in the range of 3.0 to 10 parts by mass, with respect to 100 parts by mass of a binder resin. Making the amount of wax components added to be 2.5 parts by mass or more enables easy oilless fixation. Making the additive amount to be 15 parts by mass or less can suppress excessive presence of the wax components on the toner particle surface, which presence affects the charging property of a toner.

<About Coloring Agents>

As coloring agents in the toner according to the present invention, dye compounds represented by the general formula (1) can be used singly or as a mixture of two or more. As required, other dye compounds can be used concurrently.

The other dye compounds usable concurrently are not especially limited. Specific examples of the other dye compounds are as follows. The examples are condensed azo compounds, azo metal complexes, diketopyrrolopyrrole compounds, anthraquinone compounds, quinacridone compounds, basic dye lake compounds, naphthol compounds, benzimidazolone compounds, thioindigo compounds, perylene compounds, methine compounds, and allylamide compounds.

More specific examples thereof include various types of dye compounds classified as C.I. Pigment Orange 1, 5, 13, 15, 16, 34, 36, 38, 62, 64, 67, 72, and 74; C.I. Pigment Red 2, 3, 4, 5, 6, 7, 12, 16, 17, 23, 31, 32, 41, 48, 48:1, 48:2, 48:3, 48:4, 53:1, 57:1, 81:1, 112, 122, 123, 130, 144, 146, 149, 150, 166, 168, 169, 170, 176, 177, 178, 179, 181, 184, 185, 187, 190, 194, 202, 206, 208, 209, 210, 220, 221, 224, 238, 242, 245, 253, 254, 255, 258, 266, 269, and 282; C.I. Pigment Violet 13, 19, 25, 32, and 50; and derivatives thereof.

The total content of these coloring agents with respect to 100 parts by mass of a binder resin in a toner can be 1 to 20 parts by mass.

<About Charge Control Agents>

In the toner according to the present invention, as required, a charge control agent may be mixed and used. Thereby, an optimum frictional charge amount according to a development system can be controlled.

As the charge control agent, known charge control agents can be utilized and charge control agents exhibiting a high charging speed and being capable of stably maintaining a certain charge amount are especially preferable. Further in the case where a toner is produced directly by a polymerization method, charge control agents exhibiting low polymerization inhibition and having substantially no materials soluble to an aqueous dispersion medium are especially preferable.

Examples of charge control agents which control a toner to negative charging among the above charge control agents are as follows.

The examples are polymers or copolymers having a sulfonic acid group, a sulfonate salt group or a sulfonate ester group, salicylic acid derivatives and metal complexes thereof, monoazo metallic compounds, acetylacetone metallic compounds, aromatic oxycarboxylic acids, aromatic mono- and polycarboxylic acids and metal salts, anhydrides and esters thereof, phenol derivatives such as bisphenol, urea derivatives, metal-containing naphthoic acid-based compounds, boron compounds, quarternary ammonium salts, calixarenes, and resin-based charge control agents.

Examples of charge control agents which control a toner to positive charging are as follows.

The examples are nigrosins and nigrosins modified with fatty acid metal salts or the like, guanidine compounds, imidazole compounds, tributylbenzylammonium-1-hydroxy-4-naphthosulfonate salts, quaternary ammonium salts such as tetrabutylammonium tetrafluoroborate, onium salts such as phosphonium salts, which are analogs of the quaternary ammonium salts, and lake pigments thereof, triphenylmethane dyes and lake pigments thereof (laking agents include tungstophosphoric acid, molybdophosphoric acid, tungstomolybdophosphoric acid, tannic acid, lauric acid, gallic acid, ferricyanidated substances, and ferrocyanidated substances), metal salts of higher fatty acids, diorganotin oxides such as dibutyltin oxide, dioctyltin oxide, and dicyclohexyltin oxide, diorganotin borates such as dibutyltin borate, dioctyltin borate, and dicyclohexyltin borate, and resin-based charge control agents. These charge control agents may be used singly or as required, may be used in combination of two or more.

<About Fluidizing Agents>

In the toner according to the present invention, an inorganic fine powder may be added as a fluidizing agent. As the inorganic fine powder, fine powders of silica, titanium oxide, alumina, a double oxide thereof, and the like, and surface-treated fine powders thereof can be used.

Then, methods for producing the toner according to the present invention will be described. The methods for producing the toner according to the present invention include a pulverization method, a suspension polymerization method, a suspension granulation method, an emulsion polymerization method, and an emulsion aggregation method, which are conventionally used. The toner is especially preferably obtained by a production method of granulating the toner in an aqueous medium such as a suspension polymerization method and a suspension granulation method from the viewpoint of the environmental load in the production time and the controllability of the particle system.

The toner according to the present invention may be used also for a developer (hereinafter, referred to as a liquid developer) used in the liquid development method.

<About Dye Dispersions>

Dye dispersions used for the toner according to the present invention will be described.

The dye dispersion used in the present invention refers to a dye dispersion in the state in which the above coloring agent is dispersed in a dispersion medium.

The dye dispersion can be obtained, for example, as follows.

The above coloring agent and as required, a resin are dissolved in a dispersion medium, and made to be adapted to the dispersion medium under stirring. Further by applying a mechanical shearing force by a dispersing machine such as a ball mill, a paint shaker, a dissolver, an attritor, a sand mill, or a high-speed mill, the coloring agent can be finely dispersed in a stable and homogeneous fine particulate state.

Here, the above dispersion medium refers to water, an organic solvent, or a mixture thereof.

In the case of using water as a dispersion medium, a coloring agent can be dispersed in water using an emulsifying agent. Examples of the emulsifying agent include cationic surfactants, anionic surfactants, and nonionic surfactants. The cationic surfactant includes dodecylammonium chloride, dodecylammonium bromide, dodecyltrimethylammonium bromide, dodecylpyridinium chloride, dodecylpyridinium bromide, and hexadecyltrimethylammonium bromide. The anionic surfactant includes fatty acid soaps such as sodium stearate and sodium dodecanoate, sodium dodecylsulfate, sodium dodecylbenzenesulfate, and sodium laurylsulfate. The nonionic surfactant includes dodecyl polyoxyethylene ethers, hexadecyl polyoxyethylene ethers, nonylphenyl polyoxyethylene ethers, lauryl polyoxyethylene ethers, sorbitan-monooleate polyoxyethylene ethers, and monodecanoyl sucroses.

Organic solvents usable as a dispersion medium are not especially limited, but include alcohols such as methyl alcohol, ethyl alcohol, denatured ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, and cyclohexanol; glycols such as methyl cellosolve, ethyl cellosolve, diethylene glycol, and diethylene glycol monobutyl ether; ketones such as acetone, methyl ethyl ketone, and methyl isobutyl ketone; esters such as ethyl acetate, butyl acetate, ethyl propionate, and cellosolve acetate; hydrocarbon-based solvents such as hexane, octane, petroleum ethers, cyclohexane, benzene, toluene, and xylene; halogenated hydrocarbon-based solvents such as carbon tetrachloride, trichloroethylene, and tetrabromoethane; ethers such as diethyl ether, dimethyl glycol, trioxane, and tetrahydrofuran; acetals such as methylal and diethyl acetal; organic acids such as formic acid, acetic acid, and propionic acid; and sulfur or nitrogen-containing organic compounds such as nitrobenzene, dimethylamine, monoethanolamine, pyridine, dimethyl sulfoxide, and dimethylformamide.

As the dispersion medium, polymerizable monomers may be used. The polymerizable monomers are addition-polymerization or polycondensation monomers, and can be addition-polymerization monomers, which specifically include styrene-based monomers such as styrene, o-methylstyrene, m-methylstyrene, p-methylstyrene, o-ethylstyrene, m-ethylstyrene, and p-ethylstyrene; acrylate-based monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylic acid amide; methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and methacrylic acid amide; olefin-based monomers such as ethylene, propylene, butylene, butadiene, isoprene, isobutylene, and cyclohexene; halogenated vinyls such as vinyl chloride, vinylidene chloride, vinyl bromide, and vinyl iodide; vinyl esters such as vinyl acetate, vinyl propionate, and vinyl benzoate; vinyl ethers such as vinyl methyl ether, vinyl ethyl ether, and vinyl isobutyl ether; and vinyl ketone compounds such as vinyl methyl ketone, vinyl hexyl ketone, and methyl isopropenyl ketone. These may be used singly or in combination of two or more according to use applications. In the case where a polymerized toner is produced using the dye dispersion according to the present invention, among the above polymerizable monomers, styrene or a styrene-based monomer can be used singly or as a mixture with other polymerizable monomers. Styrene is especially preferable from the viewpoint of easy handleability.

As resins which can be added to the above dye dispersion, the resins usable as the binder resins for the toner according to the present invention can be used. The resins specifically include polystyrene resins, styrene-methacrylic acid copolymers, styrene-acrylic acid copolymers, epoxy resins, styrene-butadiene copolymers, polyacrylic acid resins, polymethacrylic acid resins, polyacrylate ester resins, polymethacrylate ester resins, acrylic acid-based copolymers, methacrylic acid-based copolymers, polyester resins, polyvinyl ether resins, polyvinyl methyl ether resins, polyvinyl alcohol resins, polyvinyl butyral resins, polyurethane resins, and polypeptide resins. These resins may be used singly or as a mixture of two or more.

The amount of a coloring agent in a dispersion medium in the above dye dispersion can be 1.0 to 30 parts with respect to 100 parts of the dispersion medium. The amount is more preferably 2.0 to 20 parts, and especially preferably 3.0 to 15 parts. If the amount is less than 1.0 part by mass, it is difficult to secure a sufficient toner concentration in some cases; and if the amount exceeds 20 parts by mass, a coloring agent not included in the toner particle is likely to increase. If the content of a coloring agent is in the above range, the rise in the viscosity and the deterioration of the coloring agent dispersibility can be prevented and good coloring power can be exhibited.

The above dye dispersion can be isolated by a known method, for example, filtration, decantation or centrifugal separation. The solvent may be removed by washing.

To the above dye dispersion, auxiliary agents may further be added in the production time. Specific examples of the auxiliary agent are surfactants, pigment and non-pigment dispersants, fillers, standardizers, resins, waxes, defoaming agents, antistatic agents, dustproof agents, extenders, shading colorants, preservatives, drying inhibitors, rheology control additives, wetting agents, antioxidants, UV absorbents, and light stabilizers; and combinations thereof.

Since the use of the above dye dispersion can suppress the increase of the disperse viscosity in a dispersion medium, the handling in the toner production process becomes easy. Further since the dispersibility of the coloring agent is well held, a toner having a high coloring power can be provided.

<Production Method of a Toner by a Suspension Polymerization Method>

The production method of a toner by a suspension polymerization method according to the present invention will be described. First, a coloring agent containing a dye compound represented by the general formula (1), a polymerizable monomer, a wax component, a polymerization initiator, and the like are mixed to thereby prepare a polymerizable monomer composition. Then, the polymerizable monomer composition is dispersed in an aqueous medium to thereby granulate particles of the polymerizable monomer composition. Then, the polymerizable monomer in the particles of the polymerizable monomer composition is polymerized in the aqueous medium to thereby obtain a toner particle.

A polymerization initiator used in the suspension polymerization method includes known polymerization initiators, and examples thereof include azo compounds, organic peroxides, inorganic peroxides, organometal compounds, and photopolymerization initiators. More specific examples thereof include azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis (isobutyrate), organic peroxide-based polymerization initiators such as benzoyl peroxide, di-tert-butyl peroxide, tert-butylperoxyisopropyl monocarbonate, tert-hexylperoxybenzoate, and tert-butylperoxybenzoate, inorganic peroxide-based polymerization initiators such as potassium persulfate and ammonium persulfate, redox initiators such as combinations of hydrogen peroxide and a ferrous salt, BPO and dimethylaniline, and a cerium (IV) salt and an alcohol, and acetophenones, benzoin ethers, and ketals. These can be used singly or in combination of two or more.

The concentration of the above polymerization initiator can be in the range of 0.1 to 20 parts by weight, and is more preferably in the range of 0.1 to 10 parts by weight, with respect to 100 parts by weight of the polymerizable monomer. The kind of the above polymerization initiator slightly depends on polymerization methods, but is used singly or as a mixture of two or more kinds by reference to their 10-hour half-life temperature.

In an aqueous medium used in the above suspension polymerization method, a dispersion stabilizer can be contained. As the dispersion stabilizer, known inorganic and organic dispersion stabilizers can be used. Examples of the inorganic dispersion stabilizers include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina. Examples of the organic dispersion stabilizers include polyvinyl alcohols, gelatins, methyl celluloses, methyl hydroxypropyl celluloses, ethyl celluloses, sodium salts of carboxymethyl celluloses, and starches. Nonionic, anionic, and cationic surfactants also can be utilized. Examples thereof include sodium dodecylsulfate, sodium tetradecylsulfate, sodium pentadecylsulfate, sodium octylsulfate, sodium oleate, sodium laurate, potassium stearate, and calcium oleate.

In the present invention, poorly water-soluble inorganic dispersion stabilizers soluble to acids can be used among the above dispersion stabilizers. In the present invention, in the case of preparing an aqueous dispersion medium by using a poorly water-soluble inorganic dispersion stabilizer, the dispersion stabilizer can be used in a proportion of 0.2 to 2.0 parts by weight with respect to 100 parts by weight of the polymerizable monomer. This is because liquid droplets of the polymerizable monomer composition in an aqueous medium can be stabilized more. Further in the present invention, the aqueous medium can be prepared using water in the range of 300 to 3,000 parts by weight with respect to 100 parts by weight of the polymerizable monomer composition.

In the present invention, in the case of preparing an aqueous medium by using the above poorly water-soluble inorganic dispersion stabilizer, commercially available dispersion stabilizers can be used as they are. In order to obtain a dispersion stabilizer particle having a more uniform particle size, the dispersion stabilizer particle can be prepared by forming the above poorly water-soluble inorganic dispersion stabilizer under high-speed stirring in water. For example, in the case of using calcium phosphate as a dispersion stabilizer, a sodium phosphate aqueous solution and a calcium chloride aqueous solution are mixed under high-speed stirring to thereby obtain fine particles of calcium phosphate, whereby a preferable dispersion stabilizer can be obtained.

<Production Method of a Toner by a Suspension Granulation Method>

The toner according to the present invention can suitably be obtained also in the case of being produced by a suspension granulation method. Since the production process of the suspension granulation method has no heating step, the compatibilization of a resin with a wax component, which would be caused in the case of using a low-melting point wax, can be suppressed and the decrease of the glass transition temperature of the toner caused by the compatibilization can be prevented. The suspension granulation method has a broad option of binder resins; and it is thereby easy to use a polyester resin, which is generally said to be advantageous for fixability, as a main component. Therefore, the suspension granulation method is a production method advantageous in the case where a toner of a resin composition to which the suspension polymerization method cannot be applied is produced.

The toner particle produced by the above suspension granulation method is produced, for example, as follows.

First, a coloring agent containing a dye compound represented by the general formula (1), a binder resin, a wax component, and the like are mixed in a solvent to thereby prepare a solvent composition. Then, the solvent composition is dispersed in an aqueous medium to granulate particles of the solvent composition to thereby obtain a toner particle suspension liquid. Then, the obtained suspension liquid is heated or depressurized to remove the solvent to thereby obtain a toner particle.

Examples of solvents usable in the above suspension granulation method include hydrocarbons such as toluene, xylene, and hexane, halogen-containing hydrocarbons such as methylene chloride, chloroform, dichloroethane, trichloroethane, and carbon tetrachloride, alcohols such as methanol, ethanol, butanol, and isopropyl alcohol, polyhydric alcohols such as ethylene glycol, propylene glycol, diethylene glycol, and triethylene glycol, cellosolves such as methyl cellosolve and ethyl cellosolve, ketones such as acetone, methyl ethyl ketone, and methyl isobutyl ketone, ethers such as benzyl alcohol ethyl ether, benzyl alcohol isopropyl ether, and tetrahydrofuran, and esters such as methyl acetate, ethyl acetate, and butyl acetate. These may be used singly or as required, used as a mixture of two or more. Among these, solvents can be used which have a low boiling point in order to easily remove the solvent in the above toner particle suspension liquid and can sufficiently dissolve the above binder resin.

The amount of the above solvent used can be in the range of 50 to 5,000 parts by mass, and is more preferably in the range of 120 to 1,000 parts by weight, with respect to 100 parts by weight of the binder resin.

An aqueous medium used in the above suspension granulation method can contain a dispersion stabilizer. As the dispersion stabilizer, known inorganic and organic dispersion stabilizers can be used. Examples of the inorganic dispersion stabilizers include calcium phosphate, calcium carbonate, aluminum hydroxide, calcium sulfate, and barium carbonate. Examples of the organic dispersion stabilizers include water-soluble polymers such as polyvinyl alcohols, methyl celluloses, hydroxyethyl celluloses, ethyl celluloses, sodium salts of carboxymethyl celluloses, sodium polyacrylates, and sodium polymethacrylates, anionic surfactants such as sodium dodecylbenzenesulfonate, sodium octadecylsulfate, sodium oleate, sodium laurate, and potassium stearate, cationic surfactants such as laurylamine acetate, stearylamine acetate, and lauryltrimethylammonium chloride, amphoteric ionic surfactants such as lauryldimethylamine oxide, and nonionic surfactants such as polyoxyethylene alkyl ethers, polyoxyethylene alkyl phenyl ethers, and polyoxyethylene alkylamines.

The amount of the above dispersant used can be in the range of 0.01 to 20 parts by weight with respect to 100 parts by weight of the binder resin from the viewpoint of the liquid droplet stability in an aqueous medium of the solvent composition.

<Production Method of a Toner by a Pulverization Method>

The toner by a pulverization method according to the present invention can be produced using an apparatus known to those concerned in the art, such as a mixing machine, a heat kneading machine and a classifying machine.

First, a coloring agent containing a dye compound represented by the general formula (1) is mixed, as required, with a binder resin, a magnetic material, a wax, a charge control agent, and other toner components. These are sufficiently mixed by a mixing machine such as a Henschel mixer or a ball mill. Then, the mixture is melted using a heat kneading machine such as a roll, a kneader, or an extruder. The mixture is further kneaded to mutually compatibilize the resins to thereby disperse the wax and the magnetic material in the compatibilized resins. The obtained dispersion melt is, after being cooled and solidified, pulverized and classified, whereby the toner by a pulverization method according to the present invention can be obtained.

Specific examples of the binder resin usable for the toner by a pulverization method according to the present invention are as follows. The examples thereof are vinyl-based resins, polyester-based resins, epoxy-based resins, polyurethane-based resins, polyvinyl butyral-based resins, terpene-based resins, phenol-based resins, aliphatic or alicyclic hydrocarbon-based resins, aromatic petroleum-based resins, and rosins and denatured rosins. Among these, vinyl-based resins and polyester-based resins are preferable from the viewpoint of the chargeability and fixability. In particular, the case where polyester-based resins are used is more preferable because of having large effects of the chargeability and fixability.

These resins may be used singly, or as required, used concurrently in two or more. In the case of mixing and using two or more kinds of the resins, the resins having different molecular weights can be mixed in order to control the viscoelastic property of the toner.

The glass transition temperature of a binder resin used in the toner by a pulverization method according to the present invention can be 45 to 80° C., and is more preferably 55 to 70° C.; and the number-average molecular weight (Mn) can be 2,500 to 50,000, and the weight-average molecular weight (Mw) can be 10,000 to 1,000,000.

In the case of using a polyester-based resin as the binder resin, the polyester-based resin is not especially limited, but can be a polyester-based resin having a ratio in mol % of alcohol components/acid components of 45/55 to 55/45 in the total components. In a polyester-based resin used in the present invention, if the number of terminal groups of molecular chains increases, the environmental dependency in charging properties of a toner becomes large. Therefore, the acid value can be 90 mgKOH/g or less, and is more preferably 50 mgKOH/g or less. The hydroxyl value can be 50 mgKOH/g or less, and is more preferably 30 mgKOH/g or less.

<Production Method of a Toner by an Emulsion Aggregation Method>

Then, the production method of a toner by an emulsion aggregation method according to the present invention will be described. First, various types of dispersion liquids are prepared. At this time, a mixed liquid may be prepared by mixing, as required, a wax dispersion liquid, a resin particle dispersion liquid, a coloring agent particle dispersion liquid containing a dye compound represented by the general formula (1), and other toner components. Through a step of forming aggregate particles from the mixed liquid (aggregation step), a step of heating and fusing the aggregate particles (fusing step), a washing step, and a drying step, the toner by an emulsion aggregation method according to the present invention can be obtained.

The various types of dispersion liquids can be produced using dispersants such as surfactants.

The surfactants include water-soluble polymers, inorganic compounds, and ionic or nonionic surfactants. The ionic surfactants exhibiting high dispersibility can be used particularly because of the problem with dispersibility, and anionic surfactants are more preferably used. Specific examples of surfactants, though not being limited to the following, include water-soluble polymers such as polyvinyl alcohols, methyl celluloses, carboxymethyl celluloses, and sodium polyacrylates; anionic surfactants such as sodium dodecylbenzenesulfonate, sodium octadecylsulfate, sodium oleate, sodium laurate, and potassium stearate; cationic surfactants such as laurylamine acetate and lauryltrimethylammonium chloride, amphoteric ionic surfactants such as lauryldimethylamine oxide; nonionic surfactants such as polyoxyethylene alkyl ethers, polyoxyethylene alkyl phenyl ethers, and polyoxyethylene alkylamines; and inorganic compounds such as tricalcium phosphate, aluminum hydroxide, calcium sulfate, calcium carbonate, and barium carbonate. These may be used singly or as required, used in combination of two or more.

The molecular weight of the above surfactant can be 100 to 10,000, and is more preferably 200 to 5,000, from the viewpoint of washability and the surface activity.

A wax dispersion liquid used in the toner by an emulsion aggregation method according to the present invention is made by dispersing a wax in an aqueous medium. The wax dispersion liquid is prepared by a known method.

The above waxes are specifically hydrocarbon-based waxes such as low-molecular weight polyethylenes, low-molecular weight polypropylenes, microcrystalline waxes, and paraffin waxes; oxides of hydrocarbon-based waxes such as oxidized polyethylene waxes, or block copolymers thereof; fatty acid ester-based waxes such as carnauba wax, Sazol wax, and montanate ester waxes; partially or wholly deacidified fatty acid esters such as deacidified carnauba wax; saturated straight-chain fatty acids such as palmitic acid, stearic acid, and montanic acid; unsaturated fatty acids such as brassidic acid, eleostearic acid, and valinalic acid; saturated alcohols such as stearyl alcohol, aralkyl alcohols, behenyl alcohol, carnaubyl alcohols, ceryl alcohol, and melissyl alcohol; polyhydric alcohols such as sorbitol; fatty acid amides such as linolic acid amide, oleic acid amide, and lauric acid amide; saturated fatty acid bisamides such as methylenebisstearic acid amide, ethylenebiscapric acid amide, ethylenebislauric acid amide, and hexamethylenebisstearic acid amide; unsaturated fatty acid amides such as ethylenebisoleic acid amide, hexamethylenebisoleic acid amide, N,N'-dioleyladipic acid amide, and N,N'-dioleylsebacic acid amide; aromatic bisamides such as m-xylenebisstearic acid amide and N,N'-distearylisophthalic acid amide; aliphatic metal salts (usually referred to as metallic soaps) such as calcium stearate, calcium laurate, zinc stearate, and magnesium stearate; aliphatic hydrocarbon-based waxes grafted with a vinylic monomer such as styrene or acrylic acid; partially esterified substances of a fatty acid and a polyhydric alcohol, such as monoglyceryl behenate; methyl ester compounds having a hydroxyl group, obtained by hydrogenation or otherwise of vegetable oils; and alcohols or carboxylic acids of a long chain alkyl having 12 or more carbon atoms, which all are often used. Preferable examples among the above include hydrocarbon-based waxes, fatty acid ester-based waxes, and saturated alcohols from the viewpoint of the balance of the mold releasability and the dispersibility to resins. These waxes may be used singly or as required, used concurrently in two or more.

The melting point of the above wax can be 50° C. or more and 200° C. or less, and is more preferably 55° C. or more and 150° C. or less. In a wax having a melting point of lower than 50° C., the blocking resistance of a toner decreases in some cases; and in a wax having a melting point of higher than 200° C., the wax exudation in the fixation time decreases and the releasability in oilless fixation decreases in some cases.

The above melting point indicates a major endothermic peak temperature in a differential scanning calorimetry (DSC) curve measured according to ASTM D3418-82. The melting point of a wax is specifically a major endothermic peak temperature in a DSC curve in the temperature range of 30 to 200° C. acquired by measuring DSC using a differential scanning calorimeter (trade name: DSC822, made by Metler Tredo Co., Ltd.), in a measurement temperature range of 30 to 200° C. at a temperature-rise rate of 5° C./min, and in the second temperature-rise course under the normal temperature and normal humidity.

A resin particle dispersion liquid used for the toner by an emulsion aggregation method according to the present invention is made by dispersing a resin particle in an aqueous medium. The above aqueous medium means a medium having water as a major component. Specific examples of the aqueous medium include water itself, water having a pH regulator added therein, and water having an organic solvent added therein.

A resin constituting the resin particle contained in the above resin particle dispersion liquid is not especially limited as long as being suitable to a toner, but can be a thermoplastic binder resin having a glass transition temperature lower than a fixation temperature in an electrophotographic apparatus.

Specific examples of the resin include homopolymers of styrenes such as styrene, parachlorostyrene, and α-methylstyrene, vinyl group-based monomers such as methyl acrylate, ethyl acrylate, n-propyl acrylate, lauryl acrylate, 2-ethylhexyl acrylate, methyl methacrylate, ethyl methacrylate, n-propyl methacrylate, lauryl methacrylate, 2-ethylhexyl methacrylate, acrylonitrile, and methacrylonitrile, vinyl ether-based monomers such as vinyl methyl ether and vinyl isobutyl ether, vinyl ketone-based monomers such as vinyl methyl ketone, vinyl ethyl ketone, and vinyl isopropenyl ketone, and polyolefin-based monomers such as ethylene, propylene, and butadiene, and copolymers obtained by combining these two or more, and mixtures of the homopolymers and the copolymers thereof; and further epoxy resins, polyester resins, polyurethane resins, polyamide resins, cellulosic resins, and polyether resins, and non-vinylic condensed resins and mixtures thereof with the above vinyl-based resins, and graft polymers obtained by polymerizing vinylic monomers in the presence thereof. Polystyrene resins and polyester resins are especially preferably used from the viewpoint of the fixability and the charging performance as a toner. These resins may be used singly or concurrently in two or more.

The above resin particle dispersion liquid is prepared by a known method. For example, in the case of a resin particle dispersion liquid containing a resin particle having a vinylic monomer, particularly a styrenic monomer, as a constituent, the resin particle dispersion liquid can be prepared by emulsion-polymerizing the monomer by using a surfactant and the like.

Preparation methods of other resin particle dispersion liquids (for example, a polyester resin particle dispersion liquid) include a method in which a resin particle is dispersed in water together with an ionic surfactant and a polymeric electrolyte by a dispersing machine such as a homogenizer. A resin particle dispersion liquid can be prepared by thereafter evaporating the solvent. Alternatively, there is a method in which a surfactant is added to a resin and the resin is emulsified and dispersed in water by using a dispersing machine such as a homogenizer, or a resin particle dispersion liquid may be prepared by a phase inversion emulsion method or the like.

The median diameter in terms of volume of the resin particle in the resin particle dispersion liquid can be 0.005 to 1.0 μm, and is more preferably 0.01 to 0.4 μm. It becomes difficult for 1.0 μm or more to provide a toner particle of 3.0 to 7.5 μm, which is a weight-average particle diameter suitable as a toner particle.

The average particle diameter of a resin particle can be measured, for example, by a dynamic light scattering method (DLS), a laser scattering method, a centrifugal sedimentation method, a field-flow fractionation method or an electric sensing zone method. Here, the average particle diameter in the present invention means a 50%-cumulative particle diameter value (D50) in terms of volume measured by a dynamic light scattering method (DLS)/a laser Doppler method at 20° C. in a solid content concentration of 0.01% by mass as described later unless otherwise specified.

A coloring agent particle dispersion liquid used for the toner by an emulsion aggregation method according to the present invention can be produced by dispersing a coloring agent containing a dye compound represented by the general formula (1) together with a dispersant such as a surfactant in an aqueous medium. The coloring agent particle is dispersed by a known method, and for example, a rotary shearing homogenizer, a media-type dispersing machine such as a ball mill, a sand mill, or an attritor, and a high-pressure counter collision-type dispersing machine can be used.

The content of a coloring agent can be 1.0 to 20.0 parts by mass with respect to 100.0 parts by mass of the resin. If the content is less than 1.0 part by mass, it is difficult to secure a sufficient toner concentration in some cases; and if the content exceeds 20.0 parts by mass, a coloring agent not included in a toner particle is likely to increase.

The amount of a surfactant to be used is in the range of 0.01 to 10.0 parts by mass, and can be in the range of 0.1 to 5.0 parts by mass with respect to 100 parts by mass of a coloring agent; and the amount can be in the range of 0.5 parts by mass to 3.0 parts by mass particularly because the removal of a surfactant in a toner particle becomes easy. As a result, the amount of the surfactant remaining in the toner obtained becomes small, and effects of raising the image density of the toner and hardly generating fogging can be provided.

[Aggregation Step]

A method for forming an aggregate particle is not especially limited, but a suitable example thereof is a method in which a pH regulator, an aggregating agent, a stabilizer, and the like are added to and mixed with the above mixed liquid, and a temperature, a mechanical power (stirring), and the like are suitably applied to the mixture.

The above pH regulator is not especially limited, but includes alkalis such as ammonia and sodium hydroxide, and acids such as nitric acid and citric acid.

The above aggregating agent is not especially limited, but includes inorganic metal salts such as sodium chloride, magnesium carbonate, magnesium chloride, magnesium nitrate, magnesium sulfate, calcium chloride, and aluminum sulfate, and additionally, di- or more polyvalent metal complexes.

The above stabilizer mainly includes surfactants. The surfactant is not especially limited, but includes water-soluble polymers such as polyvinyl alcohols, methyl celluloses, carboxymethyl celluloses, and sodium polyacrylates; anionic surfactants such as sodium dodecylbenzenesulfonate, sodium octadecylsulfate, sodium oleate, sodium laurate, and potassium stearate; cationic surfactants such as laurylamine acetate and lauryltrimethylammonium chloride, amphoteric ionic surfactants such as lauryldimethylamine oxide; nonionic surfactants such as polyoxyethylene alkyl ethers, polyoxyethylene alkyl phenyl ethers, and polyoxyethylene alkylamines; and inorganic compounds such as tricalcium phosphate, aluminum hydroxide, calcium sulfate, calcium carbonate, and barium carbonate. These may be used singly or as required, used in combination of two or more.

The average particle diameter of the aggregate particle formed here is not especially limited, but may usually be controlled so as to become nearly equal to the average particle diameter of a toner particle to be obtained. The control can easily be carried out, for example, by suitably setting and changing the temperature in the addition and mixing and the conditions of the above stirring and mixing of the above aggregating agent and the like. Further in order to prevent fusing among toner particles, the above pH regulator, the above surfactant and the like can suitably be charged.

[Fusing Step]

In the fusing step, the above aggregate particle is heated and fused to thereby form a toner particle. The heating temperature may be between the glass transition temperature (Tg) of the resin contained in the aggregate particle and the decomposition temperature of the resin. For example, under stirring similar in the aggregation step, by addition of a surfactant, regulation of pH and the like, the progress of aggregation is stopped; and by heating at a temperature higher than the glass transition temperature of the resin in the resin particle, the aggregate particles are caused to fuse and unite. The heating time may be in a level carrying out the fusing sufficiently, and may specifically be about 10 min to 10 hours.

Before or after the fusing step, further a step (adhesion step) can be included in which a fine particle dispersion liquid containing fine particles dispersed therein is added and mixed to cause the fine particles to adhere on the above aggregate particle to thereby form a core-shell structure.

[Washing Step]

In the emulsion aggregation method, the toner particle obtained after the fusing step is washed, filtered, dried and otherwise under reasonable conditions to thereby obtain a toner particle. In this case, in order to secure the charging property and reliability sufficient as a toner, the toner particle can be washed sufficiently.

A washing method is not limited, but for example, a suspension liquid containing the toner particle is filtered. Then, the filtrand is stirred and washed using distilled water, and filtered. The washing is repeated until the electroconductivity of the filtrate becomes 150 μS/cm or less from the viewpoint of the chargeability of a toner. If the electroconductivity is higher than 150 μS/cm, the charging property of the toner decreases, resultantly causing faults such as fogging and a decrease in the image density.

Further on the surface of the obtained toner particle, inorganic particles such as silica, alumina, titania, and calcium carbonate, and resin particles such as vinyl-based resins, polyester resins, and silicone resins, may be added in a dry state under the application of a shearing force. These inorganic particles and resin particles function as external additives such as fluidizing auxiliary agents and washing auxiliary agents.

[Drying Step]

Drying can utilize a known method such as a conventional vibration fluidized drying method, a spray dry method, a freeze-drying method or a flash jet method. The moisture fraction of the toner particle after the drying can be 1.5% by mass or less, and is more preferably 1.0% by mass or less.

In the toner according to the present invention, the weight-average particle diameter D4 can be 4.0 to 9.0 μm, and the ratio (hereinafter, referred to as a weight-average particle diameter D4/a number-average particle diameter D1, or D4/D1) of the weight-average particle diameter D4 to the number-average particle diameter D1 can be 1.35 or less. More preferably, the weight-average particle diameter D4 is 4.9 to 7.5 μm, and D4/D1 is 1.30 or less. In the case where the proportion of the toner less than 4.0 μm in the value of the weight-average particle diameter D4 increases, the charging stability can hardly be achieved when the toner is applied to electrophotographic development systems, and image deteriorations such as image fogging and development streaks are liable to generate in a continuous development operation of a large number of sheets (durability operation). Particularly in the case where the proportion of the toner of fine powder of 2.5 μm or less increases, the tendency becomes remarkable. In the case where the proportion of the toner whose weight-average particle diameter D4 exceeds 8.0 μm increases, the reproductivity of the halftone portions largely decreases and obtained images become rough images, which is not preferable. Particularly in the case where the proportion of the toner of coarse powder of 10.0 μm or more increases, the tendency becomes remarkable. In the case where D4/D1 exceeds 1.35, fogging and transferability decrease and the variation in the thickness of line width of fine lines becomes large (hereinafter, mentioned as sharpness decrease).

A regulation method of the weight-average particle diameter D4 and the number-average particle diameter D1 of the toner according to the present invention depends on a production method of a toner base particle. For example, in the case of the suspension polymerization method, the regulation can be carried out by controlling the dispersant concentration used in the preparation time of an aqueous dispersion medium, the reaction stirring speed, the reaction stirring time, and the like.

In the toner according to the present invention, the average degree of circularity measured by a flow-type particle image analyzer can be 0.930 to 0.995, and is more preferably 0.960 to 0.990, from the viewpoint of transferability of the toner.

The toner according to the present invention may be either of a magnetic toner and a nonmagnetic toner. In the case of using the toner as a magnetic toner, the toner particle constituting the toner according to the present invention may be used by mixing magnetic materials. Such magnetic materials include iron oxides such as magnetite, maghemite, and ferrite, iron oxides containing other metal oxides, metals such as Fe, Co, and Ni, alloys of these metals with metals such as Al, Co, Cu, Pb, Mg, Ni, Sn, Zn, Sb, Be, Bi, Cd, Ca, Mn, Se, Ti, W, and V, and mixtures thereof.

<Production Method of a Liquid Developing Agent>

Hereinafter, a production method of a liquid developing agent will be described.

First, a dye compound represented by the general formula (1), a resin, and as required, auxiliary agents such as a charge control agent and a wax are dispersed or dissolved in an electrically insulating carrier liquid to thereby produce a liquid developing agent. Alternatively, a liquid developing agent may be prepared by a two-stage method in which a concentrated toner is fabricated first, and further diluted with an electrically insulating carrier liquid to thereby prepare the developing agent.

A dispersing machine used in the present invention is not especially limited, but for example, a rotary shearing homogenizer, a media-type dispersing machine such as a ball mill, a sand mill, or an attritor, and a high-pressure counter collision-type dispersing machine can be used.

To a dye compound represented by the general formula (1), further a known coloring agent such as a pigment or a dye may be added singly or in combination of two or more.

A wax and a coloring agent used in the present invention are similar to the above.

A charge control agent used in the present invention is not especially limited as long as being a charge control agent used for liquid developing agents for electrostatic charge development, but examples thereof include cobalt naphthenate, copper naphthenate, copper oleate, cobalt oleate, zirconium octoate, cobalt octoate, sodium dodecylbenzenesulfonate, calcium dodecylbenzenesulfonate, soy lecithin, and aluminum octoate.

An electrically insulating carrier liquid used in the present invention is not especially limited, but for example, an organic solvent having a high electric resistance of $10^9$ Ω·cm or more and a low permittivity of 3 or less can be used. As specific examples thereof, organic solvents having a boiling point in the temperature range of 68 to 250° C. can be used, including aliphatic hydrocarbon solvents such as hexane, pentane, octane, nonane, decane, undecane, and dodecane, Isopar H, G, K, L, and M (made by ExxonMobile Chemicals Co.), and Linearen Dimer A-20 and A-20H (made by Idemitsu Kosan Co., Ltd.). These may be used singly or concurrently in two or more in the range in which the viscosity of the system does not rise.

EXAMPLES

Hereinafter, the present invention will be described in more detail by way of Examples and Comparative Examples, but the present invention is not limited to these Examples. "Parts" and "%" in the description are in terms of mass unless otherwise specified. The identification of an obtained reaction product was carried out by a plurality of analysis methods using apparatuses described below. That is, the apparatuses used were a $^1$H nuclear magnetic resonance spectrometer (ECA-400, made by JEOL Ltd.) and a MALDI MS (AutoFlex, made by Bruker Daltonics GmbH). Here, the MALDI MS employed the negative ion mode detection.

[Production of Compounds Represented by the General Formula (1)]

Compounds represented by the general formula (1) can be synthesized by known methods.

Production Example 1

Production of a Compound (1)

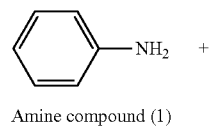

Amine compound (1)

+

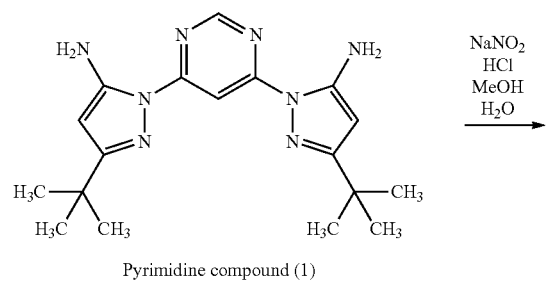

Pyrimidine compound (1)

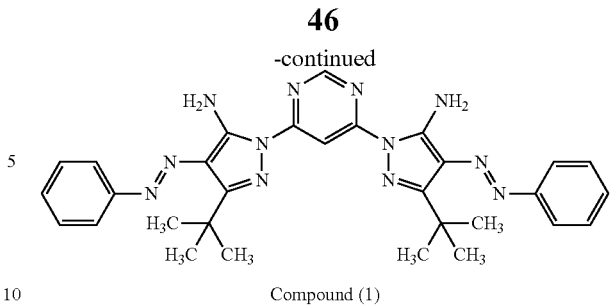

Compound (1)

20 mL of a methanol (MeOH) solution of 1.03 g of an amine compound (1) was cooled to 5° C., and 3 mL of a 35% hydrochloric acid was dropped therein. 5 mL of a water solution of 0.86 g of sodium nitrite was dropped therein (diazotized A liquid). Separately, 30 mL of a methanol liquid of 1.78 g of a pyrimidine compound (1) was cooled to 5° C., and the diazotized A liquid was slowly dropped therein so that the temperature was held at 5° C. or less, and further stirred at 0 to 5° C. for 1 hour. After the completion of the reaction, a sodium carbonate aqueous solution was dropped to neutralize the pH at 6, and thereafter, a deposited solid was filtered, and further washed with water. The obtained solid was dispersed in and washed with toluene to thereby obtain 1.78 g of a compound (1).

[Analysis Results of the Compound (1)]

[1] $^1$H-NMR (400 MHz, CDCl$_3$, room temperature): δ (ppm)=8.71 (1H, s), 8.59 (4H, br), 8.39 (1H, s), 7.73 (4H, d), 7.46 (4H, dd), 7.33 (2H, t), 1.58 (18H, s).

[2] MALDI-TOF Mass Spectrometry: m/z=561.095 (M-H)$^-$

Production Example 2

Production of a Compound (4)

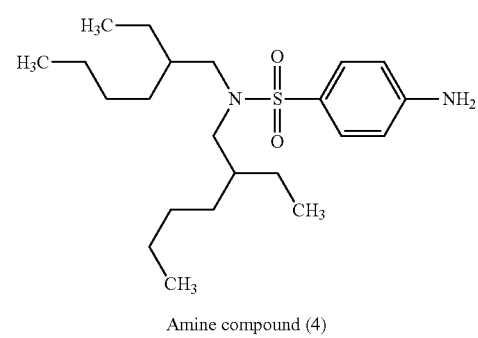

Amine compound (4)

+

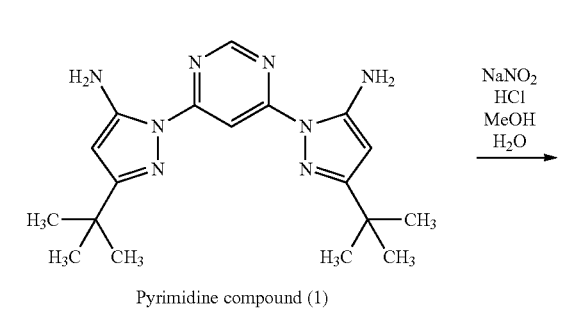

Pyrimidine compound (1)

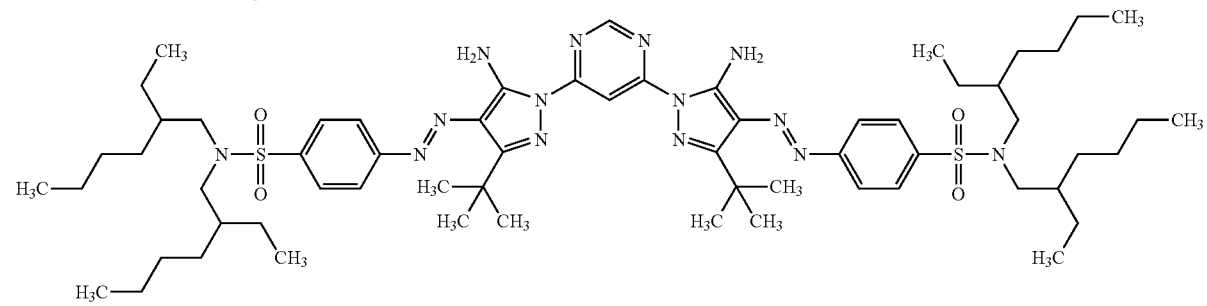

Compound (4)

30 mL of a methanol (MeOH) solution of 1 g of an amine compound (4) was cooled to 5° C., and 0.7 mL of a 35% hydrochloric acid was dropped therein. 3 mL of a water solution of 0.2 g of sodium nitrite was dropped therein, and stirred for 1 hour, and thereafter, 0.03 g of amidosulfuric acid was added thereto to decompose excess sodium nitrite to thereby obtain a diazotized B liquid. Separately, 30 mL of a methanol liquid of 0.41 g of a pyrimidine compound (1) was cooled to 5° C., and the diazotized B liquid was slowly dropped therein so that the temperature was held at 5° C. or less, and further stirred at 0 to 5° C. for 1 hour. After the completion of the reaction, a sodium carbonate aqueous solution was dropped to neutralize the pH at 6, and thereafter, the resultant was extracted with chloroform. The chloroform layer was concentrated, and an obtained solid was recrystalized in a toluene/ethanol solution to thereby obtain 1.3 g of a compound (4).

[Analysis Results of the Compound (4)]

[1] $^1$H-NMR (400 MHz, CDCl$_3$, room temperature): δ (ppm)=8.83-8.72 (5H, m), 8.39 (1H, s), 7.86 (4H, d), 7.79 (4H, d), 3.78-3.68 (8H, m), 1.58 (18H, s), 1.45-1.15 (34H, m), 0.93-0.81 (26H, m).

[2] MALDI-TOF Mass Spectrometry: m/z=1167.886 (M-H)$^-$ 20 mL of a N,N-dimethylformamide (DMF) solution of 1.59 g of an amine compound (10) was cooled to 5° C., and 10 mL of N,N-dimethylformamide (DMF) solution of a 40% nitrosylsulfuric acid was slowly dropped therein. 3 mL of a water solution of 0.345 g of sodium nitrite was dropped therein, and stirred for 1 hour, and thereafter, 0.06 g of amidosulfuric acid was added thereto to decompose excess nitrosylsulfuric acid to thereby obtain a diazotized C liquid. Separately, 8 mL of a dimethylformamide solution of 0.71 g of a pyrimidine compound (1) was cooled to 5° C., and the diazotized C liquid was slowly dropped therein so that the temperature was held at 5° C. or less, and further stirred at 0 to 5° C. for 2 hours. After the completion of the reaction, the resultant was extracted with chloroform. The chloroform layer was concentrated, and an obtained solid was refined (developing solvent: chloroform) by gel permeation chromatography, and further washed with methanol to thereby obtain 0.55 g of a compound (10).

[Analysis Results of the Compound (10)]

[1] $^1$H-NMR (400 MHz, CDCl$_3$, room temperature): δ (ppm)=8.73 (1H, s), 8.68-8.63 (4H, br), 8.39 (1H, s), 7.73 (4H, d), 7.46 (4H, d), 3.50-3.44 (4H, m), 3.26-3.22 (4H, m), 1.85-1.79 (2H, m), 1.58 (18H, s), 1.45-0.71 (58H, m).

[2] MALDI-TOF Mass Spectrometry: m/z=1095.915 (M-H)$^-$

Production Example 3

Production of a Compound (10)

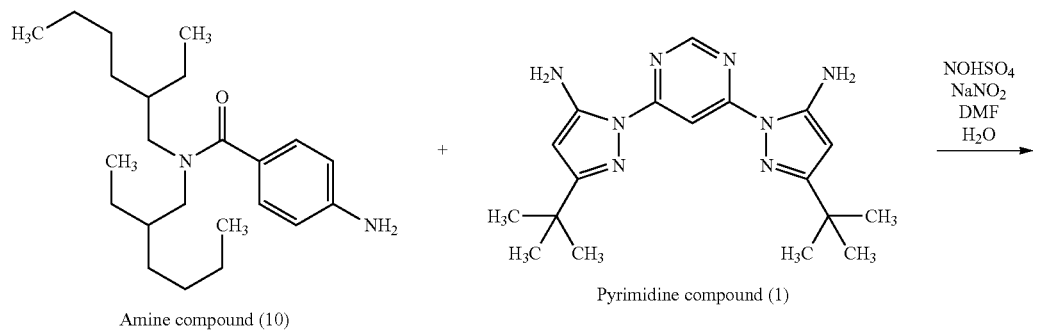

Amine compound (10)    Pyrimidine compound (1)

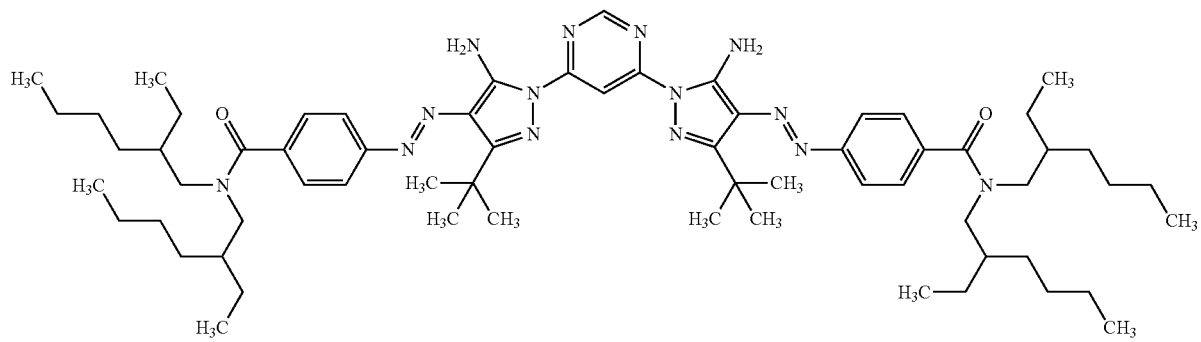

Compound (10)

Production Example 4

Production of a Compound (16)

A compound (16) was obtained by the operation similar to Production Example 1, except for altering the amine compound (1) to a corresponding amine compound, in Production Example 1.

[Analysis Results of the Compound (16)]
[1] $^1$H-NMR (400 MHz, CDCl$_3$, room temperature): δ (ppm)=8.70 (1H, s), 8.68-8.52 (4H, br), 8.34 (1H, s), 7.75-7.68 (2H, m), 7.45-7.37 (2H, m), 7.32-7.27 (4H, m), 3.21-3.15 (4H, m), 2.99-2.88 (4H, m), 1.86-1.80 (2H, m), 1.58 (18H, s), 1.45-0.45 (58H, m).
[2] MALDI-TOF Mass Spectrometry: m/z=1095.821 (M-H)$^-$

Production Example 5

Production of a Compound (22)

A compound (22) was obtained by the operation similar to Production Example 1, except for altering the amine compound (1) to a corresponding amine compound, in Production Example 1.

[Analysis Results of the Compound (22)]
[1] $^1$H-NMR (400 MHz, CDCl$_3$, room temperature): δ (ppm)=8.79-8.60 (5H, m), 8.34 (1H, s), 7.71-7.66 (2H, m), 7.35-7.29 (4H, m), 3.42-2.90 (16H, m), 1.85-1.74 (4H, m), 1.57 (18H, s), 1.49-0.38 (116H, m).
[2] MALDI-TOF Mass Spectrometry: m/z=1630.243 (M-H)$^-$

Production Example 6

Production of a Compound (36)

A compound (36) was obtained by the operation similar to Production Example 3, except for altering the pyrimidine compound (1) to a triazine compound (1), in Production Example 3.

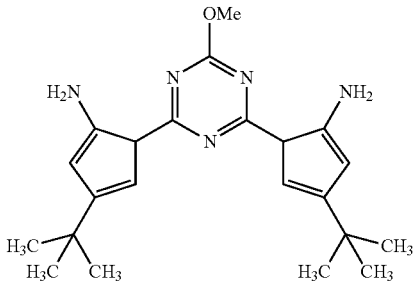

Triazine compound (1)

[Analysis Results of the Compound (36)]
[1] MALDI-TOF Mass Spectrometry: m/z=1127.931 (M-H)$^-$

Production Example 7

Production of a Compound (37)

A compound (37) was obtained by the operation similar to Production Example 1, except for altering the pyrimidine compound (1) to a triazine compound (1), in Production Example 1.

[Analysis Results of the Compound (37)]
[1] MALDI-TOF Mass Spectrometry: m/z=592.262 (M-H)$^-$

Production Example 8

Production of a Compound (38)

A compound (38) was obtained by the operation similar to Production Example 4, except for altering the pyrimidine compound (1) to a triazine compound (1), in Production Example 4.

[Analysis Results of the Compound (38)]
[1] MALDI-TOF Mass Spectrometry: m/z=1126.180 (M-H)$^-$

Production Example 9

Production of a Compound (39)

A compound (39) was obtained by the operation similar to Production Example 1, except for altering the amine compound (1) to a corresponding amine compound, in Production Example 1.

[Analysis Results of the Compound (39)]
[1] MALDI-TOF Mass Spectrometry: m/z=1169.742 (M-H)$^-$

Production Example 10

Production of a Compound (40)

A compound (40) was obtained by the operation similar to Production Example 1, except for altering the amine compound (1) to a corresponding amine compound, in Production Example 1.

[Analysis Results of the Compound (40)]
[1] $^1$H-NMR (400 MHz, CDCl$_3$, room temperature): δ (ppm)=9.54 (4H, br), 8.72 (1H, s), 8.34 (1H, s), 7.79 (2H, d), 7.49 (2H, t), 7.40 (2H, t), 3.82 (2H, br), 3.24-2.87 (8H, m), 1.48 (18H, s), 1.36-1.26 (4H, m), 1.15-0.98 (8H, m), 0.89 (3H, t), 0.73 (3H, t).

[Production of Yellow Toners]

The yellow toners according to the present invention and comparative yellow toners were produced by methods described below.

Example 1

A mixture of 5 parts of the compound (1) and 120 parts of styrene was dissolved for 3 hours by an attritor (made by Mitsui Mining Co., Ltd.) to thereby obtain a dye dispersion (1) according to the present invention.

710 parts of ion-exchange water and 450 parts of a 0.1 mol/l trisodium phosphate aqueous solution were added to a 2 L four-necked flask equipped with a high-speed stirrer T.K. Homomixer (made by Primix Corp.) with the rotation frequency being regulated at 12,000 rpm, and heated at 60° C. 68 parts of a 1.0 mol/l calcium chloride aqueous solution was gradually added thereto to thereby prepare an aqueous dispersion medium containing a fine poorly water-soluble dispersion stabilizer, calcium phosphate.

Dye dispersion (1): 133.2 parts
Styrene monomer: 46.0 parts
n-Butyl acrylate monomer: 34.0 parts
Aluminum salicylate compound: 2.0 parts (made by Orient Chemical Industries, Ltd., Bontron E-88)
Polar resin: 10.0 parts (a polycondensate of a propylene oxide-modified bisphenol A with isophthalic acid, Tg=65° C., Mw=10,000, Mn=6,000)

Ester wax: 25.0 parts
(the maximum endothermic peak temperature in DSC measurement=70° C., Mn=704)

Divinylbenzene monomer: 0.10 part

The above formulation was heated at 60° C., and homogeneously dissolved and dispersed at 5,000 rpm using a T.K. Homomixer. 10 parts of 2,2'-azobis(2,4-dimethylvaleronitrile) being a polymerization initiator was dissolved therein to thereby prepare a polymerizable monomer composition. The polymerizable monomer composition was charged in the above aqueous medium and the resultant was granulated for 15 min while the rotation frequency was maintained at 12,000 rpm. Thereafter, a stirrer was changed from the high-speed stirrer to a propeller stirrer blade; the polymerization was continued at a liquid temperature of 60° C. for 5 hours, and was continued at a raised liquid temperature of 80° C. for 8 hours. After the completion of the polymerization reaction, the remaining monomer was distilled out at 80° C. under reduced pressure, and thereafter, the liquid temperature was cooled to 30° C. and a polymer fine particle dispersion was obtained.

Then, the polymer fine particle dispersion was transferred to a washing vessel; and dilute hydrochloric acid was added thereto under stirring to regulate the pH to 1.5, and stirred for 2 hours. The resultant was subjected to solid-liquid separation by a filter to thereby obtain a polymer fine particle. The redispersion of the polymer fine particle in water and the solid-liquid separation were repeatedly carried out until the compound of phosphoric acid and calcium containing calcium phosphate was sufficiently removed. Thereafter, the polymer fine particle having been subjected to the final solid-liquid separation was sufficiently dried by a drying machine to thereby obtain a yellow toner base particle (1).

With respect to 100 parts of the obtained yellow toner base particle, 1.00 part of a hydrophobic silica fine powder (number-average primary particle diameter: 7 nm) surface-treated with hexamethyldisilazane, 0.15 part of a rutile-type titanium oxide fine powder (number-average primary particle diameter: 45 nm), and 0.50 part of a rutile-type titanium oxide fine powder (number-average primary particle diameter: 200 nm) were dry-mixed for 5 min by a Henschel mixer (made by Nippon Coke & Engineering Co., Ltd.) to thereby obtain a yellow toner (1) according to the present invention.

Example 2

A yellow toner (2) according to the present invention was obtained as in Example 1, except for altering the compound (1) to 6 parts of the compound (16), in Example 1.

Example 3

A yellow toner (3) according to the present invention was obtained as in Example 1, except for altering the compound (1) to 5.5 parts of the compound (36), in Example 1.

Example 4

A yellow toner (4) according to the present invention was obtained as in Example 1, except for altering the compound (1) to 7 parts of the compound (39), in Example 1.

Comparative Example 1

A comparative yellow toner (comparative 1) was obtained as in Example 1, except for altering the compound (1) to the comparative compound (1), in Example 1.

The comparative compounds were as follows.

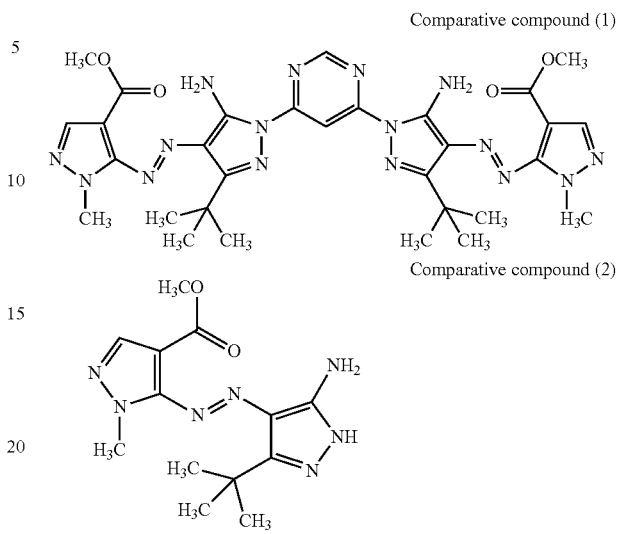

Comparative compound (1)

Comparative compound (2)

Example 5

82.6 parts of styrene, 9.2 parts of n-butyl acrylate, 1.3 parts of acrylic acid, 0.4 part of hexanediol acrylate, and 3.2 parts of n-laurylmercaptane were mixed and dissolved. An aqueous solution having 1.5 parts of Neogen RK (made by Daiichi Kogyo Seiyaku Co., Ltd.) and 150 parts of ion-exchange water was added to and dispersed in the solution. An aqueous solution having 0.15 part of potassium persulfate and 10 parts of ion-exchange water was further added to the resultant while the resultant was slowly stirred for 10 min. After nitrogen replacement, the emulsion polymerization was carried out at 70° C. for 6 hours. After the completion of the polymerization, the reaction liquid was cooled to room temperature, and ion-exchange water was added to thereby obtain a resin particle dispersion liquid having a solid content concentration of 12.5% by mass and a median diameter in terms of volume of 0.2 μm.

100 parts of the ester wax (the maximum endothermic peak temperature in DSC measurement=70° C., Mn=704), and 15 parts of Neogen RK were mixed in 385 parts of ion-exchange water, and dispersed for about 1 hour using a wet-type jet mill JN100 (made by Jokoh Co., Ltd.) to thereby obtain a wax dispersion liquid. The concentration of the wax particle dispersion liquid was 20% by mass.

100 parts of the compound (4) and 15 parts of Neogen RK were mixed in 885 parts of ion-exchange water, and dispersed for about 1 hour using a wet-type jet mill JN100 (made by Jokoh Co., Ltd.) to thereby obtain a compound (4) dispersion liquid.

The median diameter in terms of volume of the coloring agent particle in the compound (4) dispersion liquid was 0.2 μm, and the concentration of the compound (4) dispersion liquid was 10% by mass.

160 parts of the resin particle dispersion liquid, 10 parts by mass of the wax dispersion liquid, 10 parts by mass of the compound (4) dispersion liquid, and 0.2 part of magnesium sulfate were dispersed using a homogenizer (made by IKA-Werke GmbH & Co. KG, Ultra-Turrax T50), and heated to 65° C. under stirring. After the stirring at 65° C. for 1 hour, the mixture was observed by an optical microscope, and the formation of aggregate particles having an average particle diameter of about 6.0 μm was confirmed. After 2.2 parts of Neogen RK (Daiichi Kogyo Seiyaku Co., Ltd.) was added, the mixture was heated to 80° C., and stirred for 120 min to thereby obtain a fused spherical toner particle. A solution containing the toner particle was cooled, and thereafter filtered, and the filtered-out solid was stirred and washed with 720 parts of ion-exchange water for 60 min. The similar washing was repeated until a solution containing the toner particle was filtered and the electroconductivity of the filtrate became 150 μS/cm or less. The washed filtrand was dried using a vacuum drier to thereby obtain a toner base particle (4).

100 parts of the toner base particle (4) was dry-mixed with 1.8 parts of the hydrophobized silica fine powder having a specific surface area of 200 m²/g as measured by BET method by a Henschel mixer (Mitsui Mining Co., Ltd.) to thereby obtain a yellow toner (5).

Example 6

A yellow toner (6) according to the present invention was obtained as in Example 5, except for altering the compound (4) to 7 parts by mass of the compound (10), in Example 5.

Example 7

A yellow toner (7) according to the present invention was obtained as in Example 5, except for altering the compound (4) to 5.5 parts by mass of the compound (37), in Example 5.

Comparative Example 2

A comparative yellow toner (comparative 2) was obtained as in Example 5, except for altering the compound (4) to the comparative compound (2), in Example 5.

Example 8

100 parts by mass of a binder resin (polyester resin) (Tg: 55° C., acid value: 20 mgKOH/g, hydroxyl value: 16 mgKOH/g, molecular weight: Mp: 4,500, Mn: 2,300, Mw: 38,000), 5 parts of the compound (22), 0.5 part by mass of an aluminum 1,4-di-t-butylsalicylate compound, and 5 parts by mass of a paraffin wax (maximum endothermic peak temperature: 78° C.) were sufficiently mixed by a Henschel mixer (FM-75J, made by Mitsui Mining Co., Ltd.), and thereafter kneaded (the temperature of a kneaded material in discharge was about 150° C.) by a twin-screw kneading machine (PCM-45, made by Ikegai Corp.) whose temperature was set at 130° C. in a feed amount of 60 kg/hr. The obtained kneaded material was cooled and coarsely pulverized by a hammer mill, and thereafter finely pulverized by a mechanical crusher (T-250, made by Turbo Kogyo Co., Ltd.) in a feed amount of 20 kg/hr.

An obtained toner fine pulverized material was further classified by a multi-division classifying machine utilizing the Coanda effect to thereby obtain a toner base particle.

100 parts of the toner base particle was dry-mixed with 1.8 parts of a hydrphobized silica fine powder having a specific surface area of 200 m²/g as measured by BET method by a Henschel mixer (made by Mitsui Mining Co., Ltd.) to thereby obtain a yellow toner (8).

Example 9

A yellow toner (9) according to the present invention was obtained by the method similar to Example 8, except for altering the compound (22) to the compound (37), in Example 8.

Example 10

A yellow toner (10) according to the present invention was obtained by the method similar to Example 8, except for altering the compound (22) to the compound (40), in Example 8.

Comparative Example 3

A yellow toner (comparative 2) was obtained by the method similar to Example 8, except for altering the compound (22) to the comparative compound (2), in Example 5.

(1) Measurements of a Weight-Average Particle Diameter D4 and a Number-Average Particle Diameter D1 of a Toner The number-average particle diameter (D1) and the weight-average particle diameter (D4) of the above toner particle were measured by the particle size distribution analyzer using the Coulter method. The measurement used, as the measurement apparatus, a Coulter Counter TA-II or a Coulter Multisizer II (made by Beckman Coulter, Inc.), and was carried out according to the operation manual of the apparatus. As an electrolyte solution, an about 1% sodium chloride aqueous solution was prepared by using an extrapure sodium chloride. For example, ISOTON-II (made by Coulter Scientific Japan Co., Ltd.) can be used. The specific measurement method was such that 0.1 to 5 ml of a surfactant (which can be an alkylbenzenesulfonate salt) as a dispersant was added to 100 to 150 ml of the above electrolytic aqueous solution, and 2 to 20 mg of the measurement sample (toner particle) was further added. The electrolyte solution in which the sample was suspended was subjected to a disperse treatment for about 1 to 3 min by an ultrasonic disperser. The obtained dispersed liquid was loaded on the above measurement apparatus equipped with an aperture of 100 μm, and the volume and the number of the toner particles of 2.00 μm or more were measured by the measurement apparatus and the volume distribution and the number distribution of the toner were calculated. Then, the number-average particle diameter (D1) was determined from the number distribution of the toner particle, and the weight-average particle diameter (D4) of the toner particle was determined from the volume distribution of the toner particle (a median value of each channel was taken as a representative value of the each channel), and D4/D1 was determined.

The above channels were 13 channels of 2.00 to 2.52 μm, 2.52 to 3.17 μm, 3.17 to 4.00 μm, 4.00 to 5.04 μm, 5.04 to 6.35 μm, 6.35 to 8.00 μm, 8.00 to 10.08 μm, 10.08 to 12.70 μm, 12.70 to 16.00 μm, 16.00 to 20.20 μm, 20.20 to 25.40 μm, 25.40 to 32.00 μm, and 32.00 to 40.30 μm.

(2) Measurement of an Average Degree of Circularity of a Toner

The circularity was measured using a flow-type particle image measurement apparatus "FPIA-2100" (made by Sysmex Corp.), and the average degree of circularity was calculated using the following expression.

Equivalent-circle diameter=√(particle projection area/π)×2

Degree of circularity=(perimeter of a circle of the same area as the particle projection area)/(perimeter of a particle projection image)　　[Expression 1]

Here, the "particle projection area" is defined as an area of a binarized toner particle image, and the "perimeter of a particle projection image" is defined as a length of outlines obtained by connecting edge points of the toner particle image. The degree of circularity is an index indicating the degree of irregularity of a particle; in the case where a particle has a complete spherical shape, the degree of circularity is 1.000, and the more complex the surface shape, the smaller value the degree of circularity has.

(3) Evaluation of Image Samples Using the Yellow Toners

Then, by using above-mentioned toners Nos. 1 to 10 and Comparative 1 to 6, image samples were outputted, and image properties described later were comparatively evaluated. Here, when the image properties were compared, paper-passing durability tests were carried out using a remodeled machine of LBP-5300 (made by Canon Corp.) as an image formation apparatus (hereinafter, abbreviated to LBP). The remodeling content was such that the developing blade in the process cartridge (hereinafter, abbreviated to CRG) was replaced by a SUS blade of 8 μm in thickness. Besides, a blade bias of −200 V was designed to be applied vs. a development bias applied to a development roller being a toner carrier.

For the evaluation, each CRG in which each yellow toner was individually filled was prepared for every evaluation item. The each CRG in which the each toner was filled was set on the LBP, and was evaluated for every evaluation item described below.

<Measurement of the Color Gamut>

16-gradation image samples in which a maximum toner loading amount was adjusted at 0.45 mg/cm$^2$ were fabricated under the ordinary environment (temperature: 25° C., humidity: 60% RH) by using a color copying machine CLC-1100 remodeled machine (made by Canon Corp., the fixing oil coating mechanism was removed). At this time, as a base paper of the image sample, a CLC color copy sheet (made by Canon Corp.) was used. The obtained image samples were measured for the chromaticity (L*, a*, b*) in the L*a*b* color space by using a SpectroLino (made by Gretag Machbeth Co.). The chroma (c*) was calculated by the following expression based on the measurement value of the color property.

$$c^* = \sqrt{(a^*)^2 + (b^*)^2}$$

[Evaluation of the Color Tone]

The color tone was evaluated as follows.

A larger extension of the chromaticity in the green gamut direction in a same L* can be said to be more useful for extension of the green color gamut. The evaluation was carried out using values of a* and b* when L* was 92. The a* and b* when L was 92 were determined by interpolation from the L*, a*, b* obtained for each image sample.

A: a* was less than −5, and b* was 100 or more (more approaching to the green chromaticity)

B: a* was −5 or more, and b* was 100 or more (approaching to the green chromaticity)

C: a case excluding the conditions of A and B (far from the green chromaticity)

<Evaluation of the Chroma>

The chroma was evaluated as follows.

A higher chroma c* at an amount of a coloring agent per a same unit area can be said to exhibit better extension of the lightness and the chroma. The evaluation was carried out using the chroma c* when an image sample was fabricated as described above. Here, c* was calculated by the above expression.

A: c* was 112 or more (extension of the chroma was very good)

B: c* was 108 or more and less than 112 (extension of the chroma was good)

C: c* was less than 108 (extension of the chroma was poor)

<Light Resistance>

Image samples were outputted using the obtained toners. The recorded matters were charged in an Atlas Weather-Meter (Ci4000, made by Toyo Seiki Seisaku-sho, Ltd.), and exposed for 100 hours. The measurement condition at this time was set such that the black panel was at 50° C.; the chamber was at 40° C.; the humidity was 60%; and the irradiance at 340 nm was at 0.39 W/m$^2$. The test papers before and after the irradiation were analyzed by a SpectroLino (made by Gretag Machbeth Co.). The optical density and the chromaticity (L*, a*, b*) in the L*a*b* color space were measured. The color difference (ΔE) was calculated by the following expression based on the measurement value of the color property.

Color difference(ΔE)=√{(a*before the test−a*after the test)$^2$+(b*before the test−b*after the test)$^2$+(L*before the test−L*after the test)$^2$}

The evaluation was carried out as follows, and ΔE less than 10 was rated to be good light resistance.

A: ΔE was less than 5 (light resistance was very good)

B: ΔE was 5 or more and less than 10 (light resistance was good)

C: ΔE was 10 or more (light resistance was poor)

The above results are shown in Table 1.

TABLE 1

| | | | | | | | Color Tone at L* = 92 | | | Chroma | |
| --- | --- | --- | --- | --- | --- | --- | --- | --- | --- | --- | --- |
| | Toner No. | Compound No. | Toner | D50 | D4/D1 | Degree of Circularity | a* | b* | Color Tone Evaluation | c* | Chroma Evaluation | Light Resistance |
| Example 1 | 1 | 1 | polymerization method | 6.12 | 1.26 | 0.97 | −3.7 | 115.0 | A | 115.1 | A | A |
| Example 2 | 2 | 16 | polymerization method | 5.97 | 1.25 | 0.97 | −3.9 | 116.5 | A | 116.6 | A | A |
| Example 3 | 3 | 36 | polymerization method | 6.23 | 1.23 | 0.97 | −4.2 | 116.0 | A | 116.1 | A | A |
| Example 4 | 4 | 39 | polymerization method | 5.01 | 1.28 | 0.96 | −2.3 | 116.8 | A | 116.8 | A | A |
| Example 5 | 5 | 4 | emulsion-aggregation method | 6.01 | 1.29 | 0.98 | −5.3 | 113.2 | A | 113.3 | A | A |
| Example 6 | 6 | 10 | emulsion-aggregation method | 6.11 | 1.25 | 0.98 | −4.9 | 117.6 | A | 117.7 | A | A |
| Example 7 | 7 | 37 | emulsion-aggregation method | 5.99 | 1.28 | 0.97 | −3.3 | 114.3 | A | 114.3 | A | A |
| Example 8 | 8 | 22 | pulverization method | 5.89 | 1.16 | 0.91 | −4.9 | 112.1 | A | 112.2 | A | A |
| Example 9 | 9 | 38 | pulverization method | 5.87 | 1.11 | 0.89 | −4.5 | 114.6 | A | 114.7 | A | A |
| Example 10 | 10 | 40 | pulverization method | 5.66 | 1.09 | 0.90 | −4.2 | 114.2 | A | 114.3 | A | A |

TABLE 1-continued

| | Toner No. | Compound No. | Toner | D50 | D4/D1 | Degree of Circularity | Color Tone at L* = 92 a* | b* | Color Tone Evaluation | Chroma c* | Chroma Evaluation | Light Resistance |
|---|---|---|---|---|---|---|---|---|---|---|---|---|
| Comparative Example 1 | Comparative 1 | Comparative compound 1 | comparative polymerization method | 5.87 | 1.33 | 0.96 | −3.6 | 110.6 | A | 110.7 | B | B |
| Comparative Example 2 | Comparative 2 | Comparative compound 1 | comparative emulsion-aggregation method | 6.03 | 1.26 | 0.97 | −5.1 | 109.9 | B | 110.0 | B | B |
| Comparative Example 3 | Comparative 3 | Comparative compound 2 | comparative pulverization method | 5.66 | 1.12 | 0.92 | −5.5 | 105.3 | C | 105.4 | C | C |

It is clear from the toners produced by different production methods as shown in Table 1, that is, the toners by the polymerization method (Examples 1 to 4 and Comparative Example 1), the toners by the emulsion aggregation method (Examples 5 to 7 and Comparative Example 2) and the toners by the pulverization method (Examples 8 to 10 and Comparative Example 3), that the yellow toners obtained in the present invention had better color tones, and exhibited better extensions of chromas and also better light resistances than the corresponding comparative yellow toners. Use of compounds represented by the general formula (1) is recognized to give a remarkable effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184756, filed on Aug. 24, 2012 which is hereby incorporated by reference herein in its entirety.

What is claimed is:
1. A yellow toner comprising, at least, a binder resin, a wax, and a coloring agent,
wherein the coloring agent is a compound represented by general formula (1):

General formula (1)

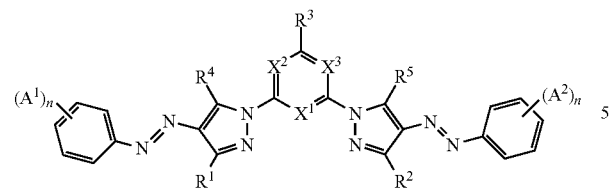

wherein:
$R^1$ and $R^2$ each independently represent a hydrogen atom, an alkyl group, or an aryl group;
$R^3$ represents a hydrogen atom, an alkyl group, an aryl group, or an alkoxy group;
$R^4$ and $R^5$ each independently represent a hydrogen atom or an amino group;
$X^1$ to $X^3$ each independently represent a carbon atom or a nitrogen atom;
$A^1$ and $A^2$ each independently represent a hydrogen atom, an alkyl group, an alkoxy group, an aryl group, a carbamoyl group, a carboxylate ester group, a carboxylic acid amide group, a sulfonate ester group, a sulfonic acid amide group, a trifluoromethyl group, a cyano group, a hydroxy group, a nitro group, an amino group, or a halogen atom; and
n represents an integer of 1 to 5.

2. The yellow toner according to claim 1,
wherein in the general formula (1),
the alkyl group as $R^1$ and $R^2$ is a primary to tertiary alkyl group having 1 to 20 carbon atoms; and
the aryl group as $R^1$ and $R^2$ is a phenyl group, a methylphenyl group, or a dimethylphenyl group.

3. The yellow toner according to claim 1, wherein $A^1$ and $A^2$ in the general formula (1) are each independently a carboxylate ester, a carboxylic acid amide, or a sulfonic acid amide.

4. The yellow toner according to claim 1, wherein in the general formula (1)
$X^1$ is a carbon atom and $X^2$ and $X^3$ are each a nitrogen atom, or $X^1$, $X^2$ and $X^3$ are each a nitrogen atom.

5. The yellow toner according to claim 1, wherein the yellow toner is obtained by suspension-polymerizing a polymerizable monomer in a polymerizable monomer composition containing the polymerizable monomer and a coloring agent represented by the general formula (1) in an aqueous medium.

6. The yellow toner according to claim 1, wherein the yellow toner is obtained by emulsion-aggregating resin particles and particles of a coloring agent represented by the general formula (1) in an aqueous medium.

7. The yellow toner according to claim 1, wherein the yellow toner is obtained by kneading a resin and a coloring agent represented by the general formula (1) to obtain a kneaded material and pulverizing the kneaded material.

8. A method for producing a yellow toner, comprising:
suspension-polymerizing a polymerizable monomer in a polymerizable monomer composition containing the polymerizable monomer and a coloring agent in an aqueous medium,
wherein the coloring agent is a compound represented by the general formula (1):

General formula (1)

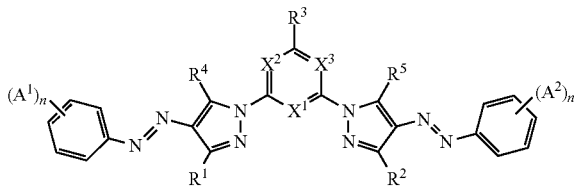

wherein:
R¹ and R² each independently represent a hydrogen atom, an alkyl group, or an aryl group;
R³ represents a hydrogen atom, an alkyl group, an aryl group, or an alkoxy group;
R⁴ and R⁵ each independently represent a hydrogen atom or an amino group;
X¹ to X³ each independently represent a carbon atom or a nitrogen atom;
A¹ and A² each independently represent a hydrogen atom, an alkyl group, an alkoxy group, an aryl group, a carbamoyl group, a carboxylate ester group, a carboxylic acid amide group, a sulfonate ester group, a sulfonic acid amide group, a trifluoromethyl group, a cyano group, a hydroxy group, a nitro group, an amino group, or a halogen atom; and
n represents an integer of 1 to 5.

9. A method for producing a yellow toner, comprising:
emulsion-aggregating resin particles and particles of a coloring agent in an aqueous medium,
wherein the coloring agent is a compound represented by general formula (1):

General formula (1)

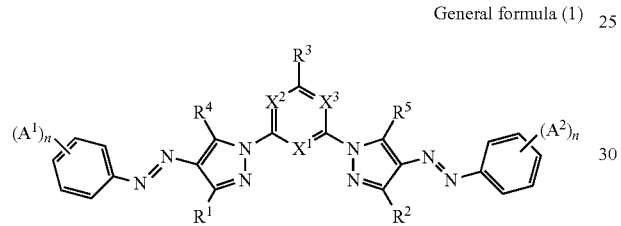

wherein:
R¹ and R² each independently represent a hydrogen atom, an alkyl group, or an aryl group;
R³ represents a hydrogen atom, an alkyl group, an aryl group, or an alkoxy group;
R⁴ and R⁵ each independently represent a hydrogen atom or an amino group;
X¹ to X³ each independently represent a carbon atom or a nitrogen atom;
A¹ and A² each independently represent a hydrogen atom, an alkyl group, an alkoxy group, an aryl group, a carbamoyl group, a carboxylate ester group, a carboxylic acid amide group, a sulfonate ester group, a sulfonic acid amide group, a trifluoromethyl group, a cyano group, a hydroxy group, a nitro group, an amino group, or a halogen atom; and
n represents an integer of 1 to 5.

10. A method for producing a yellow toner, comprising:
kneading a resin and a coloring agent, and
pulverizing the kneaded material,
wherein the coloring agent is a compound represented by general formula (1):

General formula (1)

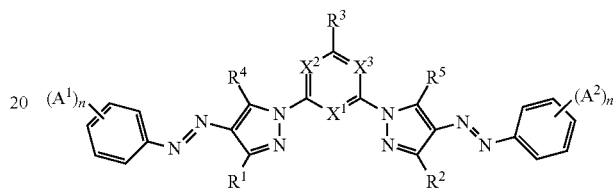

wherein:
R¹ and R² each independently represent a hydrogen atom, an alkyl group, or an aryl group;
R³ represents a hydrogen atom, an alkyl group, an aryl group, or an alkoxy group;
R⁴ and R⁵ each independently represent a hydrogen atom or an amino group;
X¹ to X³ each independently represent a carbon atom or a nitrogen atom;
A¹ and A² each independently represent a hydrogen atom, an alkyl group, an alkoxy group, an aryl group, a carbamoyl group, a carboxylate ester group, a carboxylic acid amide group, a sulfonate ester group, a sulfonic acid amide group, a trifluoromethyl group, a cyano group, a hydroxy group, a nitro group, an amino group, or a halogen atom; and
n represents an integer of 1 to 5.

* * * * *